US009878290B2

(12) United States Patent
Matsuzaki et al.

(10) Patent No.: US 9,878,290 B2
(45) Date of Patent: Jan. 30, 2018

(54) SUBMERGED MEMBRANE SEPARATOR AND MEMBRANE CARTRIDGE

(75) Inventors: Yoshio Matsuzaki, Hyogo (JP);
Kimihiro Ishikawa, Hyogo (JP);
Tatsuya Uejima, Hyogo (JP);
Tomohiko Sasaki, Hyogo (JP)

(73) Assignee: KUBOTA CORPORATION, Osaka-shi, Osaka (JP)

( * ) Notice: Subject to any disclaimer, the term of this patent is extended or adjusted under 35 U.S.C. 154(b) by 846 days.

(21) Appl. No.: 12/734,883

(22) PCT Filed: Nov. 27, 2008

(86) PCT No.: PCT/JP2008/003484
§ 371 (c)(1),
(2), (4) Date: May 28, 2010

(87) PCT Pub. No.: WO2009/069294
PCT Pub. Date: Jun. 4, 2009

(65) Prior Publication Data
US 2011/0005987 A1    Jan. 13, 2011

(30) Foreign Application Priority Data

Nov. 28, 2007  (JP) ................................ 2007-307504
Jun. 13, 2008  (JP) ................................ 2008-154930

(51) Int. Cl.
*B01D 63/08* (2006.01)
*B01D 65/08* (2006.01)
(Continued)

(52) U.S. Cl.
CPC ........... *B01D 61/18* (2013.01); *B01D 63/082* (2013.01); *B01D 65/025* (2013.01);
(Continued)

(58) Field of Classification Search
CPC ............ B01D 2315/06; B01D 2313/06; B01D 2321/185; B01D 63/082; B01D 61/18; C02F 3/1273
(Continued)

(56) References Cited

U.S. PATENT DOCUMENTS 2,312,015 A * 2/1943 Weber .......................... 210/541
6,325,928 B1 * 12/2001 Pedersen et al. ............. 210/232
(Continued)

FOREIGN PATENT DOCUMENTS

EP         0951935      * 10/1999 ........... B01D 63/081
EP     2 011 561 A1       1/2009 ............. B01D 63/08
(Continued)

OTHER PUBLICATIONS

Int'l Search Report from corresponding Int'l Patent Application No. PCT/JP2008/003484, 4 Pages.
(Continued)

*Primary Examiner* — Bobby Ramdhanie
*Assistant Examiner* — Denise R Anderson
(74) *Attorney, Agent, or Firm* — Kusner & Jaffe

(57) ABSTRACT

A submerged membrane separator includes: a plurality of membrane cartridges arranged at predetermined spaces; a flow generating device for generating flows in one direction along the membrane surfaces of the membrane cartridges; and wall members on both sides of a channel of the flow in the one direction formed between the membrane cartridges adjacent to each other. The membrane cartridges can be attached and detached from another direction substantially orthogonal to the flows in the one direction and substantially orthogonal to the arrangement direction of the membrane cartridges.

9 Claims, 26 Drawing Sheets

(51) Int. Cl.
*B01D 61/18* (2006.01)
*B01D 65/02* (2006.01)

(52) U.S. Cl.
CPC ...... *B01D 2313/02* (2013.01); *B01D 2313/06* (2013.01); *B01D 2313/56* (2013.01); *B01D 2315/06* (2013.01); *B01D 2321/02* (2013.01)

(58) Field of Classification Search
USPC ............... 210/232, 461, 321.69, 321.84
See application file for complete search history.

(56) References Cited

U.S. PATENT DOCUMENTS

| | | | | |
|---|---|---|---|---|
| 7,279,215 | B2 * | 10/2007 | Hester et al. | 428/178 |
| 2002/0179517 | A1 * | 12/2002 | Pedersen | B01D 61/18 |
| | | | | 210/321.8 |
| 2004/0007527 | A1 * | 1/2004 | Pedersen et al. | 210/650 |
| 2005/0123727 | A1 | 6/2005 | Hester et al. | 428/188 |
| 2010/0000935 | A1 * | 1/2010 | Sakai | B01D 63/082 |
| | | | | 210/455 |

FOREIGN PATENT DOCUMENTS

| | | | | |
|---|---|---|---|---|
| JP | 07-299339 | | 11/1995 | ............ B01D 63/08 |
| JP | H07299339 | * | 11/1995 | ............ B01D 63/00 |
| JP | H07299339 A | * | 11/1995 | ............ B01D 63/08 |
| JP | 08-039061 | | 2/1996 | ................ C02F 1/44 |
| JP | 10-180052 | | 7/1998 | ............ B01D 63/08 |
| JP | 11-244672 | | 9/1999 | ............ B01D 63/08 |
| JP | 2002-361051 | | 12/2002 | ............ B01D 63/08 |
| JP | 2007-512952 | | 5/2007 | ............ B01D 63/08 |
| WO | WO 2007/122839 | | 11/2007 | ............ B01D 63/00 |
| WO | WO2007122839 A1 | * | 11/2007 | .......... B01D 63/082 |

OTHER PUBLICATIONS

Supplementary European Search Report from corresponding European Patent Application No. EP 08 85 3823, 2 Pages.
Office Action (dated Jun. 11, 2013) issued in connection with corresponding Japanese Patent Application No. 2008-154930.
Office Action issued in corresponding Indian Patent Application No. 2166/KOLNP/2010 dated Jul. 13, 2015.
Hearing Notice/Detailed Report issued in corresponding Indian Patent Application No. 2166/KOLNP/2010 dated Jan. 13, 2017.

* cited by examiner

SUBMERGED MEMBRANE SEPARATOR AND MEMBRANE CARTRIDGE

TECHNICAL FIELD

The present invention relates to a submerged membrane separator submerged and arranged, for example, in a treatment tank filled with a liquid to be treated and a membrane cartridge provided in such a submerged membrane separator.

BACKGROUND ART

Conventionally, as the submerged membrane separator of this type, there has been a submerged membrane separator that is submerged in a treatment tank to separate activated sludge and treated water, as shown in FIGS. 28 to 30. A submerged membrane separator 1 includes a box-type casing 2 opened at the top and the bottom, a plurality of vertically elongated membrane cartridges 3 arrayed in parallel to one another in the casing 2, and an air diffuser 4 provided below the membrane cartridges 3.

Water intake nozzles 6 for sucking treated water 5 obtained by membrane filtration are provided on the upper end sides of the membrane cartridges 3. A plurality of slits 12 elongated in the up-down direction are formed on the left and right inner side surfaces of the casing 2. The membrane cartridges 3 are held in the casing 2 at predetermined intervals with both sides of the membrane cartridges being inserted into the slits 12 from above.

Water collecting pipes 8 for collecting the treated water 5 are provided on one side of an upper opening 7 of the casing 2. The water collecting pipes 8 and the water intake nozzles 6 of the membrane cartridges 3 are connected via connection pipes 9. A lead-out pipe 15 for leading out the treated water 5 is connected to the water collecting pipes 8. A suction pump (not shown) that generates a suction force for sucking the treated water 5 is provided in the lead-out pipe 15. A suction force may be generated by using a water head pressure of a liquid to be treated in a treatment tank as a filtration driving pressure without using the suction pump.

With this configuration, during a filtration operation, the inner sides of the membrane cartridges 3 are depressurized by the suction pump or the like while air is diffused from the air diffuser 4. Thus, sludge or the like in a liquid to be treated 11 is caught by filtration membranes 10 of the membrane cartridges 3. A liquid permeating through the filtration membranes 10 and flowing into the inner sides of the cartridges 3 is collected as the treated water 5 in the water collecting pipes 8 from the water intake nozzles 6 through the connection pipes 9, and is removed from the water collecting pipes 8 through the lead-out pipe 15.

In this case, upflow 13 is caused between the membrane cartridges 3 by bubbles of air diffused from the air diffuser 4. The matter adhering to the membrane surfaces of the membrane cartridges 3 is removed by this upflow 13.

When the membrane cartridge 3 is removed in maintenance or the like, after the filtration operation is stopped and the liquid to be treated 11 in the treatment tank 16 is discharged, as shown in FIG. 28, the membrane cartridge 3 is pulled out from the upper opening 7 to above the casing 2.

Since the air is diffused from under the membrane cartridge 3, the longer the filtration membrane 10 becomes in the top-down direction, the more effectively the air diffusion can be used. As a result, it is desirable to form the membrane cartridge 3 in an elongated shape (a rectangle) as shown in FIG. 28.

The submerged membrane separator 1 having the above-described configuration is described in, for example, Japanese Patent Application Laid-Open No. 2001-87763.

DISCLOSURE OF THE INVENTION

Problems to be Solved by the Invention

However, in the conventional form explained above, the flow rate of the upflow 13 caused by the air diffuser 4 suddenly falls in a position close to an inner side surface 2a of the casing 2. Therefore, as shown in FIG. 30, the matter adhering to both sides of the filtration membrane 10 is hardly removed compared with the matter adhering to the center of the filtration membrane 10. In some case, because of long-term use, the sludge 14 clogs a space between the sides of the filtration membranes 10 of the membrane cartridges 3 adjacent to one another. In this case, a clogging portion E of the sludge 14 is caused substantially over the entire length in the up-down direction on both sides of the filtration membrane 10. A width W of the clogging portion E of the sludge 14 is extremely small compared with a length L of the clogging portion E.

The sludge 14 in the clogging portion E puts up a resistance when the membrane cartridge 3 is pulled out. Conventionally, a direction F in which the membrane cartridge 3 is pulled out is the same as the direction of the length L of the clogging portion E of the sludge 14. Therefore, when the membrane cartridge 3 is pulled out over the length L of the clogging portion E of the sludge 14, a great deal of resistance for shearing the sludge 14 over the length L occurs and a large amount of labor is disadvantageously required for pulling out the membrane cartridge 3.

The membrane cartridge 3 is pulled out to above the casing 2 or the membrane cartridge 3 is inserted into the casing 2 from above the casing 2. Therefore, a space above the casing 2 needs to be secured high, and work in a high place disadvantageously involves risks.

As shown in FIG. 29, the water intake nozzle 6 is provided on the upper end side of the membrane cartridge 3, the connection pipe 9 is located above the membrane cartridge 3, and the upflow 13 hits the connection pipe 9 and is hindered, so that matter adhering to the membrane cartridge 3 is insufficiently removed. Further, since the upflow 13 hits the connection pipe 9 and the connection pipe 9 vibrates, it is likely that the periphery of the water intake nozzle 6 cracks.

During the filtration operation, the liquid (treated water) permeating through the filtration membrane 10 and flowing into the inner side of the membrane cartridge 3 is sucked from the water intake nozzle 6 and collected in the water collecting pipe 8. In this case, since the air is diffused from under the membrane cartridge 3, it is desirable to form the membrane cartridge 3 in a vertically elongated shape (a rectangle) in order to effectively use the air diffusion, as shown in FIG. 28.

However, even if the length in the up-down direction of the membrane cartridge 3 is required to be increased to form the membrane cartridge 3 in an elongated shape, in the submerged membrane separator in which the water intake nozzle 6 is provided only on the upper end side of the membrane cartridge 3, a sufficient suction pressure does not act on (spread to) the lower part of the membrane cartridge 3. Consequently, it is disadvantageously difficult to obtain permeate using the entire filtration membrane 10 of the membrane cartridge 3 effectively.

As a measure against the problems, it is conceivable that the water intake nozzles 6 are provided on the upper end side and the lower end side of the membrane cartridge 3. Even in this case, the upflow 13 hits the connection pipe 9 connected to the water intake nozzle 6 on the upper end side of the membrane cartridge 3 and the connection pipe 9 connected to the water intake nozzle 6 on the lower end side of the membrane cartridge 3 and is hindered, and matter adhering to the membrane cartridge 3 is insufficiently removed.

Japanese Patent Application Laid-Open No. 2000-42376 discloses a submerged membrane separator in which a plurality of water intake nozzles are provided in a membrane cartridge, only the upward water intake nozzles out of the water intake nozzles are opened and used, and the other water intake nozzles are closed and not used. Even in this case; since only the water intake nozzles on the upper end side of the membrane cartridge are used during the filtration operation, similarly to the above description, a sufficient suction pressure does not act on the lower part of the membrane cartridge, and depending on the shape of the membrane cartridge, it is disadvantageously difficult to obtain permeate using an overall filtration membrane effectively.

It is an object of the present invention to provide a submerged membrane separator in which a membrane cartridge can be easily pulled out, and a membrane cartridge by which treated water (permeate) can be obtained using an overall filtration membrane effectively.

Means for Solving the Problems

In order to attain the object, a first invention is a submerged membrane separator including:

a filtration membrane arranged on the surface of a flat membrane cartridge;

a plurality of the membrane cartridges arranged at predetermined intervals between the filtration membranes of the membrane cartridges opposed to each other;

a flow generating device for generating a flow in one direction along the membrane surface of the membrane cartridge; and wall members on both sides of the channel of the flow in the one direction formed between the membrane cartridges adjacent to each other, wherein the membrane cartridge can be attached and detached from another direction substantially orthogonal to the flow in the one direction and substantially orthogonal to the arrangement direction of the membrane cartridges.

With this configuration, the matter adhering to the membrane surface of the membrane cartridge is removed by the flow in the one direction generated by the flow generating device. However, the flow rate of the flow in the one direction suddenly falls in a position close to the sides of the membrane cartridge. Therefore, in some case, sludge clogs a space between the sides of the membrane cartridges adjacent to each other.

In this case, the clogging portion of the sludge occurs substantially over the entire length in the one direction on both sides of the membrane cartridge. The width in the other direction of the clogging portion of the sludge is extremely small compared with the length in the one direction of the clogging portion of the sludge.

When the membrane cartridge is removed in maintenance, the membrane cartridge is removed from the other direction substantially orthogonal to the flow in the one direction and substantially orthogonal to the arrangement direction of the membrane cartridges. Thus, the direction in which the membrane cartridge is removed is the same direction as the width direction of the clogging portion of the sludge rather than the length direction of the clogging portion of the sludge, unlike in the prior art. Therefore, resistance in pulling out of the membrane cartridge is generated over the width of the clogging portion of the sludge. However, since the width of the clogging portion of the sludge is extremely small compared with the length of the clogging portion as explained above, at a time when the membrane cartridge is pulled out by the width of the clogging portion of the sludge, the sludge in the clogging portion is sheared and smashed. Consequently, compared with the prior art, it is possible to reduce labor required for removing the membrane cartridge.

A second invention is the submerged membrane separator, wherein the membrane cartridge is detachably provided in a casing opened at the top, an air diffuser for generating upflow along the membrane surface of the membrane cartridge is provided below the membrane cartridge, and the membrane cartridge can be attached and detached from a sideward direction orthogonal to the upflow.

With this configuration, upflow along the membrane surface of the membrane cartridge is generated by diffusing air from the air diffuser. The matter adhering to the membrane surface of the membrane cartridge is removed by this upflow. However, the flow rate of the upflow suddenly falls in a position close to sides in the casing, i.e., a position near the sides of the membrane cartridge. Therefore, in some case, sludge clogs a space between the sides of the membrane cartridges adjacent to each other.

In this case, the clogging portion of the sludge occurs substantially over the entire length in the up-down direction on both sides of the membrane cartridge. The width in the sideward direction of the clogging portion of the sludge is extremely small compared with the length in the up-down direction of the clogging portion of the sludge.

When the membrane cartridge is removed from the inside of the casing in maintenance or the like, the membrane cartridge is removed from the sideward direction, so that the direction in which the membrane cartridge is removed is the same direction as the width direction of the clogging portion of the sludge rather than the length direction of the clogging portion of the sludge, unlike in the prior art. Therefore, resistance in removing of the membrane cartridge is generated over the width of the clogging portion of the sludge. However, since the width of the clogging portion of the sludge is extremely small compared with the length of the clogging portion, at a time when the membrane cartridge is pulled out by the width of the clogging portion of the sludge, the sludge in the clogging portion is sheared and smashed. Thus, compared with the prior art, it is possible to reduce labor required for removing the membrane cartridge from the inside of the casing.

A space above the submerged membrane separator is unnecessary. It is possible to reduce dangerous work in a high place and safety is improved.

A third invention is the submerged membrane separator, wherein a guiding member having a comb-tooth shape for guiding the membrane cartridge in an inserting and removing direction is provided in the lower part of the casing.

With this configuration, when the membrane cartridge is pulled out from the inside of the casing and when the membrane cartridge is inserted into the inside of the casing, the lower part of the membrane cartridge is guided by the guiding member. Therefore, it is possible to easily remove the membrane cartridge from and insert the membrane cartridge into the casing from the sideward direction.

A fourth invention is the submerged membrane separator, wherein a guiding member having a comb-tooth shape for guiding the membrane cartridge in a removing and inserting direction is provided in the upper part of the casing.

With this configuration, when the membrane cartridge is pulled out from the inside of the casing and when the membrane cartridge is inserted into the inside of the casing, the upper part of the membrane cartridge is guided by the guiding member. Therefore, it is possible to easily remove the membrane cartridge from and insert the membrane cartridge into the casing from the sideward direction.

A fifth invention is the submerged membrane separator, wherein a side opening through which the membrane cartridge can be inserted and removed and an openable and closable or detachable side panel for covering the side opening are provided on the side of the casing.

With this configuration, in maintenance or the like, it is possible to remove the membrane cartridge from and insert the membrane cartridge into the inside of the casing through the side opening by opening the side opening. During the filtration operation, it is possible to prevent air bubbles diffused from the air diffuser from being released to the outside of the casing through the side opening by closing the side opening.

A sixth invention is the submerged membrane separator, wherein a space maintaining member for maintaining a space between the membrane cartridges is disposed on the side of the membrane cartridge.

With this configuration, even when the membrane cartridge is increased in size, it is possible to accurately maintain the space between the membrane cartridges with the space maintaining member.

A seventh invention is the submerged membrane separator, wherein a water intake portion for sucking treated water obtained by membrane filtration is provided on the side of the membrane cartridge substantially orthogonal to another direction.

With this configuration, when the water intake portion and a water collecting pipe are connected by a connection pipe, since the water intake portion is provided on the side of the membrane cartridge substantially orthogonal to another direction, the flow in the one direction generated by the flow generating device smoothly flows without hitting the connection pipe. Therefore, the matter adhering to the membrane surface of the membrane cartridge is sufficiently removed. Since the flow in the one direction does not hit the connection pipe, vibration of the connection pipe is reduced and it is possible to prevent a crack from occurring around the water intake portion.

An eighth invention is an elongated membrane cartridge having a filtration membrane arranged on the surface, the membrane cartridge including a plurality of water intake nozzles provided on a side thereof for sucking treated water obtained by membrane filtration, wherein heights from a lower side to the water intake nozzles are different from one another.

With this configuration, during a filtration operation, by depressurizing the inner side of the membrane cartridge, a liquid having permeated through the filtration membrane and flowed into the inside of the membrane cartridge is sucked from the water intake nozzles and removed as a treatment liquid. The water intake nozzles are provided on the side of the membrane cartridge and located at different heights. Therefore, a sufficient suction pressure acts entirely over the membrane cartridge. Consequently, it is possible to obtain a treatment liquid (permeate) by effectively using the entire filtration membrane.

A ninth invention is the membrane cartridge, wherein a plurality of water intake nozzles are provided on one side of the membrane cartridge.

A tenth invention is the membrane cartridge, wherein a difference in height between the water intake nozzles is equal to or larger than a length in the sideward direction of the membrane cartridge.

With this configuration, if the difference in height between the water intake nozzles is too small, it is likely that areas where permeate can be obtained from the filtration membrane by the respective water intake nozzles overlap (interfere with) each other and the entire filtration membrane cannot be effectively used. To cope with such a problem, the difference in height between the water intake nozzles is set equal to or larger than the length in the sideward direction of the membrane cartridge. Consequently, it is possible to considerably reduce the overlap (interference) of the areas where permeate can be obtained from the filtration membrane by the respective water intake nozzles and to substantially draw out the ability of the membrane cartridge.

An eleventh invention is a submerged membrane separator including the membrane cartridge according to any one of the eighth to tenth inventions, the submerged membrane separator including:

a plurality of the membrane cartridges detachably provided in a casing; and an air diffuser that is provided below the membrane cartridge and generates upflow along the membrane surface of the membrane cartridge, wherein the membrane cartridge can be inserted into and removed from the casing from a sideward direction orthogonal to the upflow and orthogonal to the arrangement direction of the membrane cartridges.

With this configuration, since the membrane cartridge has an elongated shape, it is possible to effectively use air diffused from the air diffuser.

When the membrane cartridge is removed from the casing and replaced or maintained and inspected, the membrane cartridge may be removed in the sideward direction from the inside of the casing or inserted into the inside of the casing from the sideward direction. In this case, since the water intake nozzles are provided on the side of the membrane cartridge, the water intake nozzles do not obstruct the removal and insertion of the membrane cartridge.

In the submerged membrane separator in the form of inserting the membrane cartridge into and removing the membrane cartridge from the casing from the up-down direction as in the prior art, when a plurality of water intake nozzles are provided on the side of the membrane cartridge, the water intake nozzles obstruct the removal and insertion of the membrane cartridge.

Advantages of the Invention

As explained above, according to the present invention, when the membrane cartridge is removed, a direction in which the membrane cartridge is removed is the same direction as the width direction of the clogging portion of sludge rather than the length direction of the clogging portion of the sludge, unlike in the prior art. Therefore, resistance in pulling out of the membrane cartridge occurs over the width of the clogging portion of the sludge. However, since the width of the clogging portion of the sludge is extremely small compared with the length of the clogging portion, it is possible to reduce labor required for removing the membrane cartridge compared with the prior art.

A space above the submerged membrane separator is unnecessary. It is possible to reduce dangerous work in a high place and safety is improved. It is possible to easily remove and insert the membrane cartridge from the sideward direction of a frame body through the side opening. During the filtration operation, it is possible to prevent bubbles of air diffused from the air diffuser from being released to the outside of the casing through the side opening by closing the side opening.

It is possible to accurately maintain a space between the membrane cartridges. Further, a flow in one direction generated by the flow generating device smoothly flows without hitting the connection pipe fort connecting the water intake portion and the water collecting pipe. Therefore, matter adhering to the membrane surface of the membrane cartridge is sufficiently removed. Vibration of the connection pipe is reduced and it is possible to prevent a crack from occurring around the water intake portion.

The plurality of water intake nozzles are provided on the side of the membrane cartridge and located at different heights. Therefore, a sufficient suction pressure acts entirely over the membrane cartridge. Consequently, it is possible to obtain treated water (permeate) using the entire filtration membrane effectively.

It is possible to considerably reduce the overlap (interference) of areas where permeate can be obtained from the filtration membrane by the respective water intake nozzles and to substantially draw out the ability of the membrane cartridge.

Further, when the membrane cartridge is inserted into and removed from the inside of the casing from the sideward direction, the water intake nozzles do not obstruct the removal and insertion of the membrane cartridge. Consequently, it is possible to smoothly perform work such as replacement and maintenance and inspection of the membrane cartridge.

BEST MODE FOR CARRYING OUT THE INVENTION

A first embodiment in the present invention is explained below with reference to the drawings.

Figure 1:
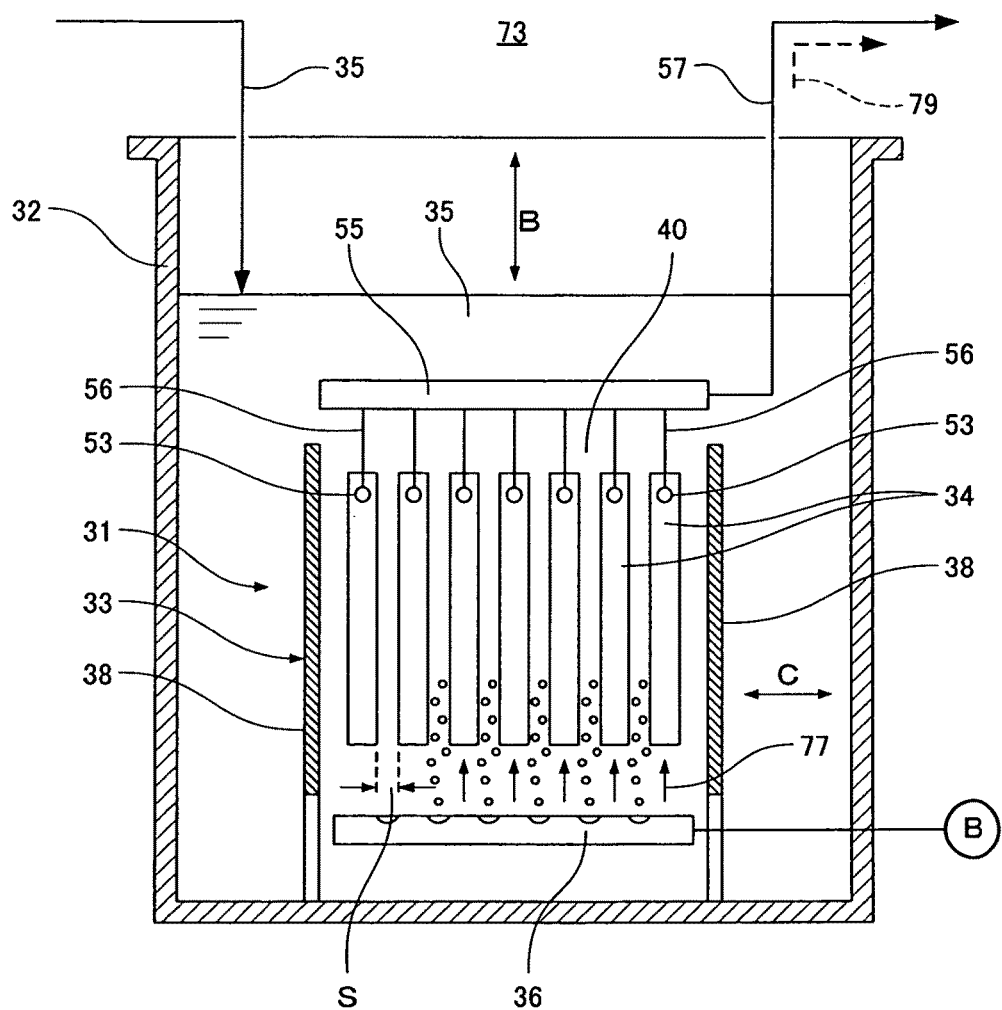
FIG. 1 is a longitudinal sectional view showing the configuration of a submerged membrane separator in a first embodiment of the present invention.

As shown in FIG. 1, reference numeral 31 denotes a submerged membrane separator. This submerged membrane separator 31 is submerged in a treatment tank 32 and separates activated sludge and treated water. The submerged membrane separator 31 includes a box-type casing 33 for membranes opened at the top and the bottom, a plurality of flat membrane cartridges 34 arrayed in parallel and opposed to one another in this casing 33, and an air diffuser 36 provided below these membrane cartridges 34.

The air diffuser 36 is an example of a flow generating device for diffusing air from a plurality of diffusing holes formed in an air diffusion pipe to thereby generate upflow 77 along the membrane surface of the membrane cartridge 34 (an example of a flow in one direction).

Figure 2:
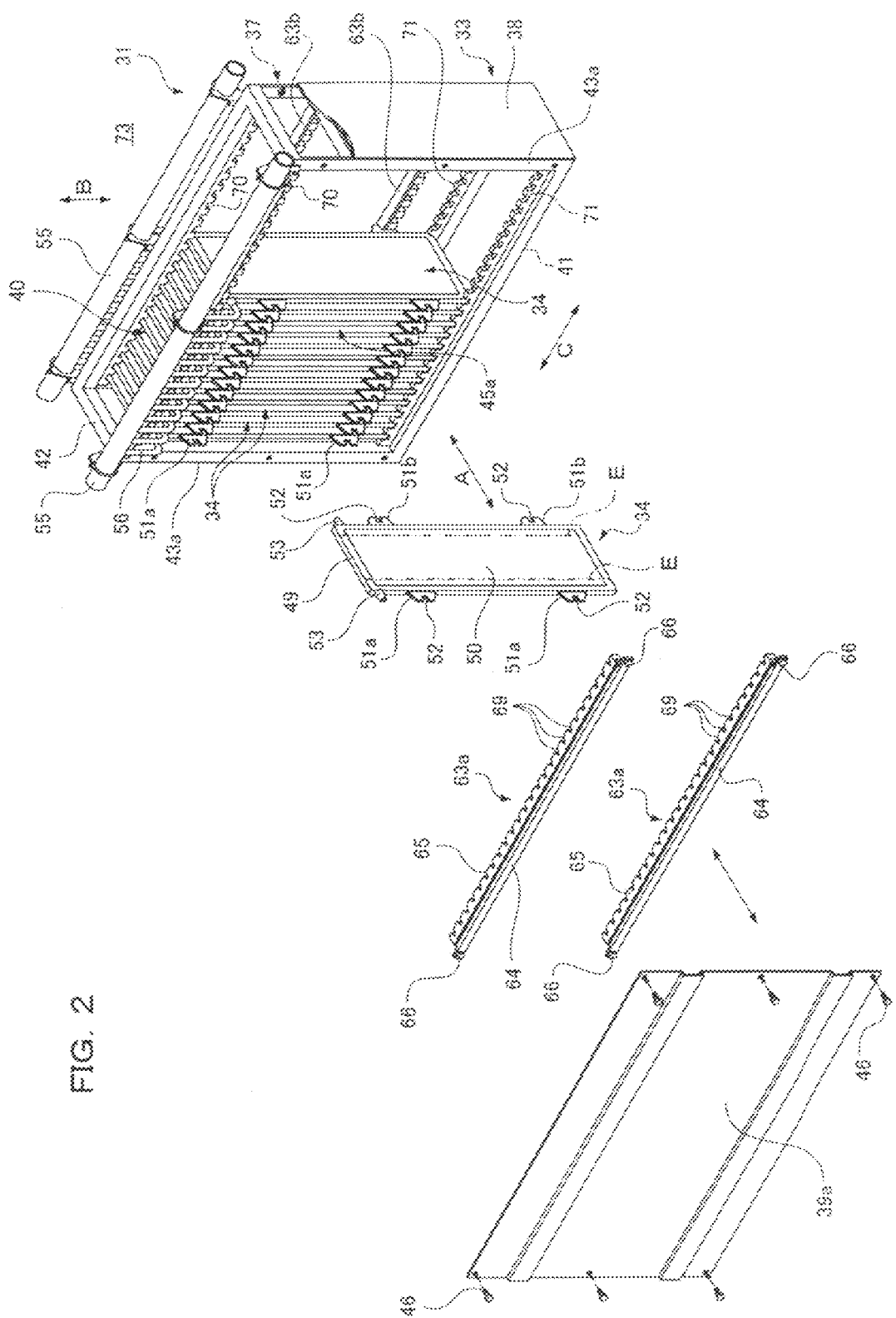
FIG. 2 is a perspective view showing a state in which a side cover and a space maintaining member are removed and a membrane cartridge is pulled out from a casing of the submerged membrane separator in the first embodiment.
Figure 3:
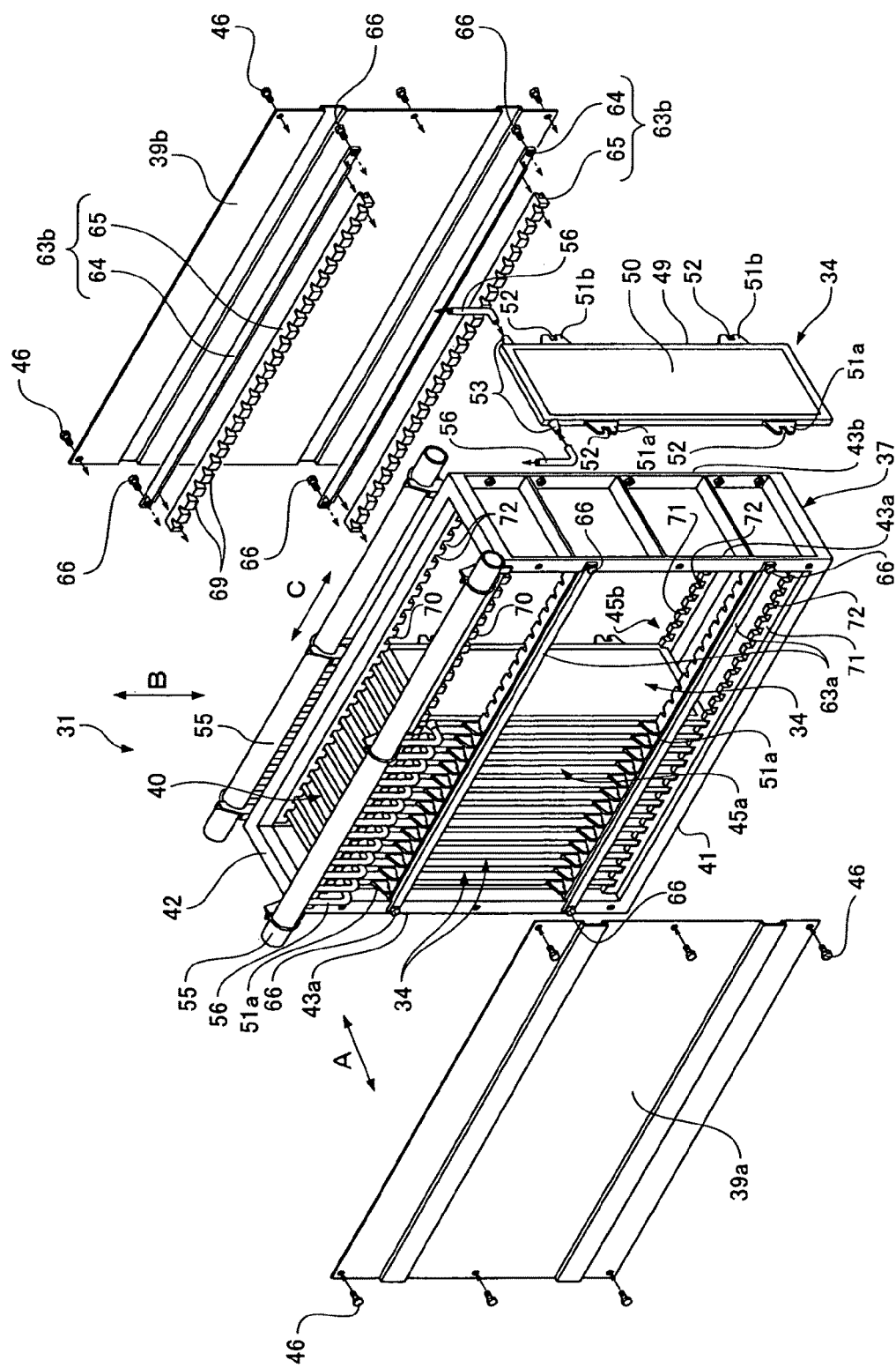
FIG. 3 is an exploded perspective view showing the configuration of the submerged membrane separator in the first embodiment.

As shown in FIGS. 2 and 3, in a setting state for the operation of the submerged membrane separator 31, the casing 33 for membranes includes a frame body 37, a pair of front and rear end covers 38 for covering both front and rear ends of the frame body 37 in an arrangement direction C of the membrane cartridges 34, and a pair of left and right side panels 39a and 39b detachably attached to both left and right sides of the frame body 37.

The side panels 39a and 39b are an example of wall members and located on both sides of a channel for the upflow 77 formed between the membrane cartridges 34 adjacent to each other.

The frame body 37 includes a bottom frame 41 having a square frame shape, an upper frame 42 having a square frame shape, and a plurality of vertical frames 43a and 43b coupled between four corners of the frames 41 and 42.

Side openings 45a and 45b through which the membrane cartridge 34 can be removed and inserted in a width direction A (left-right direction) are formed on both of the left and right sides of the frame body 37. The width direction A is an example of the sideward direction (the other direction) orthogonal to the upflow 77 and orthogonal to the arrangement direction C of the membrane cartridges 34.

The one side panel 39a is attached to the frame body 37 by a plurality of bolts 46 and closes the one side opening 45a. Similarly, the other side panel 39b is attached to the frame body 37 by a plurality of bolts 46 and closes the other side opening 45b. When the bolts 46 are removed and the one side panel 39a is removed from the frame body 37, the one side opening 45a is opened. Similarly, when the other side panel 39b is removed from the frame body 37, the other side opening 45b is opened.

Each of the membrane cartridges 34 includes a flat filtration plate 49 having a rectangular shape elongated in the up-down direction, filtration membranes 50 attached to both front and rear sides of the filtration plate 49, and a plurality of supporting portions 51a and 51b provided on both sides of the filtration plate 49. The supporting portions 51a and 51b are provided vertically in pairs on both sides of the filtration plate 49 in the width direction A and project to the outer side. Recesses 52 having a square shape are formed in the supporting portions 51a and 51b.

Water intake nozzles 53 (an example of water intake portions) for sucking treated water obtained by the filtration membranes 50 are provided at upper ends on both sides orthogonal to the width direction A (the other direction) of the filtration plate 49. Permeate channels (not shown) communicating with the water intake nozzles 53 are respectively formed on both front and rear sides of the filtration plate 49. The permeate channels are covered with the filtration membranes 50.

As shown in FIGS. 1 to 3, a pair of left and right water collecting pipes 55 for collecting treated water sucked from the water intake nozzles 53 of the membrane cartridges 34 are provided in the front-rear direction on the outer sides on the left and right of the upper frame 42 of the frame body 37. The water collecting pipes 55 and the water intake nozzles 53 are connected via connection pipes 56 having flexibility. A lead-out pipe 57 for leading out the treated water is connected to the water collecting pipes 55. A suction pump (not shown) for generating a suction force for sucking the treated water is provided in the lead-out pipe 57. A suction force may be generated by using the head pressure of water to be treated 35 in the treatment tank 32 as a filtration driving pressure without using the suction pump.

Figure 4:
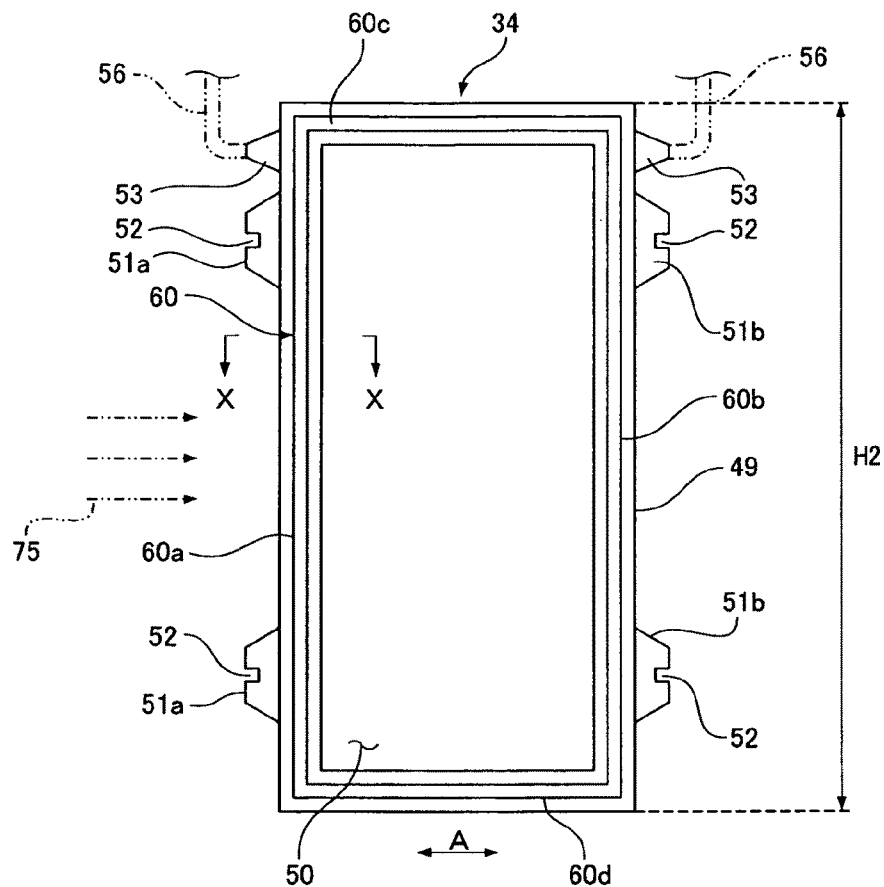
FIG. 4 is a front view of the membrane cartridge of the submerged membrane separator in the first embodiment.
Figure 5:
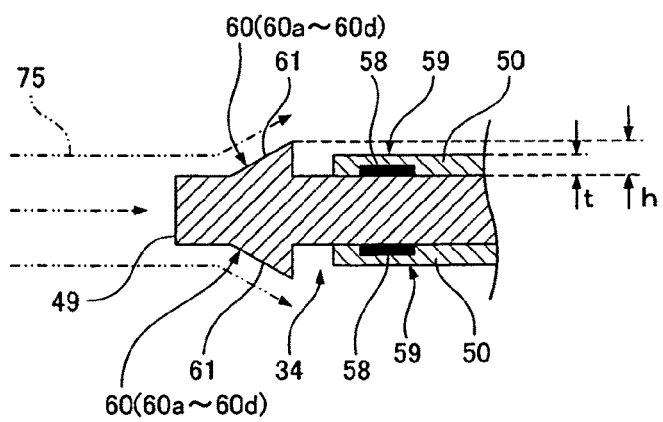
FIG. 5 is a view taken along arrows X-X in FIG. 4.
Figure 6:
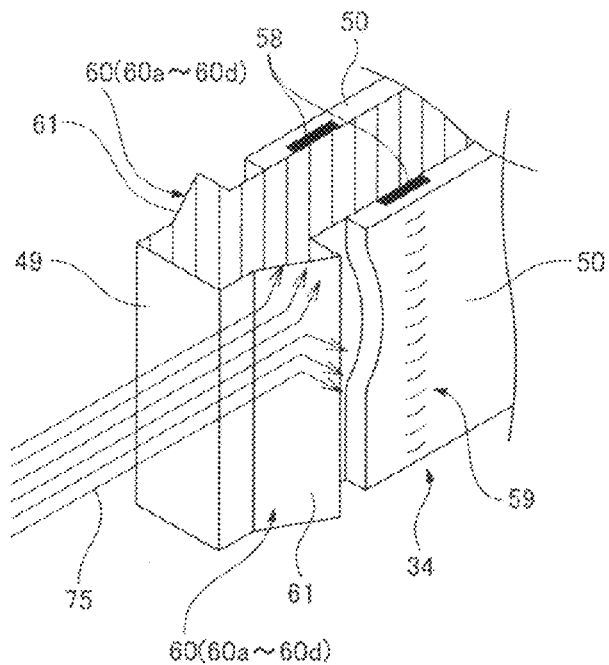
FIG. 6 is a sectional perspective view of a projecting portion of the membrane cartridge of the submerged membrane separator in the first embodiment.

As shown in FIGS. 4 to 6, the peripheral portions of the filtration membranes 50 are welded to the filtration plate 49 by ultrasound or the like, whereby the filtration membranes 50 are attached to the filtration plate 49. Welded portions 59 of the filtration membranes 50 and the filtration plate 49 are formed over the entire periphery along the peripheral portions of the filtration membranes 50.

A projecting portion 60 surrounding the outer sides of the peripheral portions of the filtration membranes 50 is formed on each of the front and rear surfaces of the filtration plate 49. The projecting portion 60 is formed in a square frame shape by a projecting portion 60a on one side, a projecting portion 60b on the other side, an upper projecting portion 60c, and a lower projecting portion 60d. The projecting portion 60a on one side is formed along the outer side of left or right one side of the filtration membranes 50. The projecting portion 60b on the other side is formed along the outer side of the other left or right side of the filtration membranes 50. The upper projecting portion 60c is formed along the outer side of the upper sides of the filtration membranes 50. The lower projecting portion 60d is formed along the outer side of the lower sides of the filtration membranes 50.

The projecting portion 60 has a triangular section and includes inclined surfaces 61 that are inclined in a projecting direction from the surface of the filtration plate 49 as being closer to the peripheral edges of the filtration membranes 50 from the peripheral edges of the filtration plate 49. A height h from the surface of the filtration plate 49 to the distal end of the projecting portion 60 is set larger than a height t (thickness) of the peripheral edges of the filtration membranes 50.

As shown in FIG. 3 and FIGS. 10 to 12, upper guiding members 70 and lower guiding members 71 having a comb-tooth shape for guiding the membrane cartridge 34 in the width direction A (an example of a removing and inserting direction) are provided in the inside of the casing 33 for membranes. The upper guiding members 70 are provided horizontally in pairs in the upper frame 42 of the frame body 37. The lower guiding members 71 are provided horizontally in pairs in the bottom frame 41.

A plurality of front and rear guiding grooves 72 are formed in each of the upper and lower guiding members 70 and 71. The upper end of the membrane cartridge 34 is freely inserted into and removed from the guiding grooves 72 of the upper guiding member 70 from the width direction A. The lower end of the membrane cartridge 34 is freely inserted into and removed from the guiding grooves 72 of the lower guiding member 71 from the width direction A.

A height H1 between upper inner surfaces 70a of the guiding grooves 72 of the upper guiding member 70 and lower inner surfaces 71a of the guiding grooves 72 of the lower guiding member 71 is set slightly larger than a height H2 of the membrane cartridge 34. Thus, the membrane cartridge 34 has a space α (i.e., α=H1−H2) in which the membrane cartridge 34 can move in an up-down direction B. A width D of the guiding grooves 72 is set slightly larger than a thickness T of the membrane cartridge 34. Consequently, the membrane cartridge 34 has a space β (i.e., (β=D−T) in which the membrane cartridge 34 can move in an arrangement direction C (the front-rear direction, the thickness direction of the membrane cartridge 34).

Figure 8A:
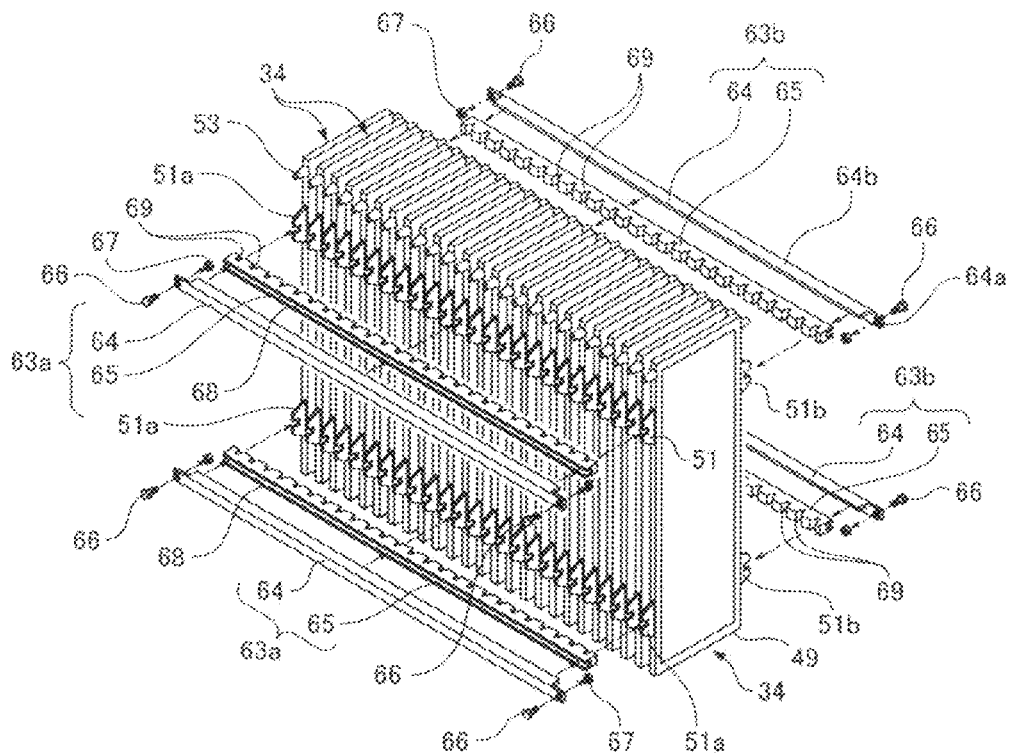
FIG. 8A is an explodes perspective view of the space maintaining member of the submerged membrane separator in the first embodiment.

As shown in FIGS. 2 and 3, pairs of left and right space maintaining members 63a and 63b for maintaining a space S between the membrane cartridges 34 at a predetermined space are provided vertically in two places in the casing 33 for membranes. As shown in FIGS. 8 and 9, these space maintaining members 63a and 63b maintain the supporting portions 51a and 51b of the membrane cartridges 34 while allowing for movement in the up-down direction B. The space maintaining members 63a and 63b include horizontal frames 64 and holding members 65 provided in the horizontal frames 64.

As shown in FIGS. 8 to 12, the horizontal frames 64 are angle-shaped members having vertical plate portions 64a and horizontal plate portions 64b. Both ends of the horizontal frame 64 are detachably coupled between the front and rear vertical frames 43a and 43b by bolts 66 and nuts 67.

The material of the holding members 65 is an elastic material such as rubber. Grooves 68 are formed over the entire length on the outer surfaces of the holding members 65. A plurality of front and rear slits 69 are formed on the inner surfaces of the holding members 65. The horizontal plate portions 64b of the horizontal frames 64 are inserted into the grooves 68 of the holding members 65, whereby the holding members 65 are attached to the horizontal frames 64.

Figure 9A:
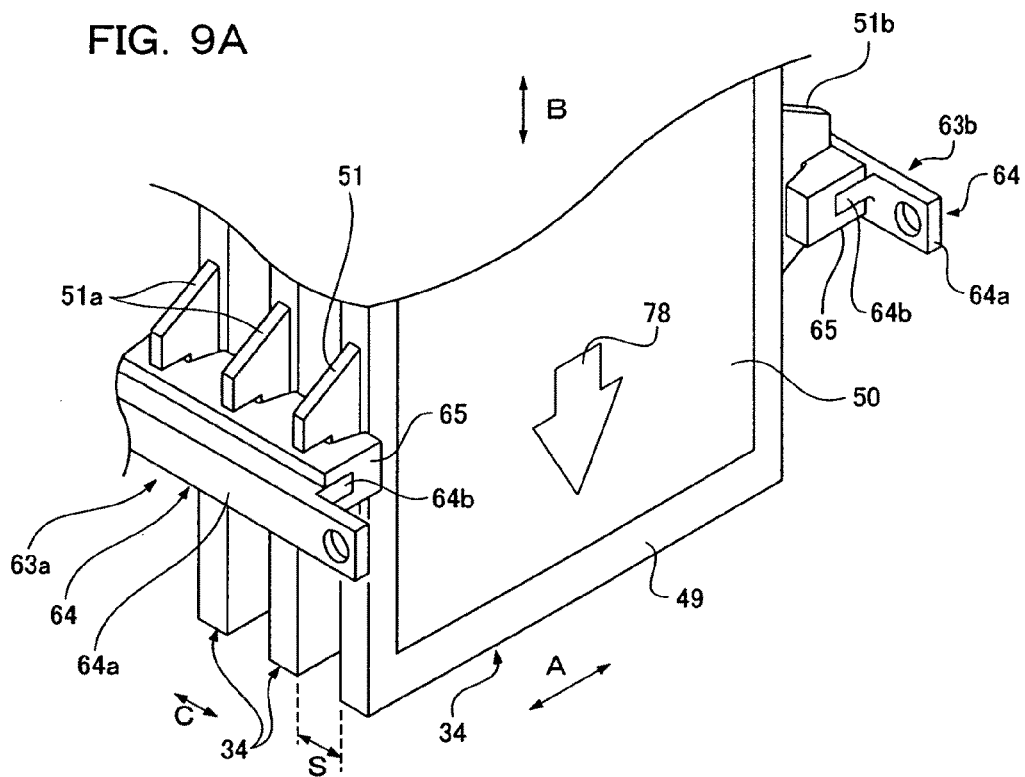
FIG. 9A is an enlarged perspective view of a mating portion of a slit of the space maintaining member and a recess of a supporting portion of the membrane cartridge of the submerged membrane separator in the first embodiment and shows a state in which air diffusion is stopped.
Figure 9B:
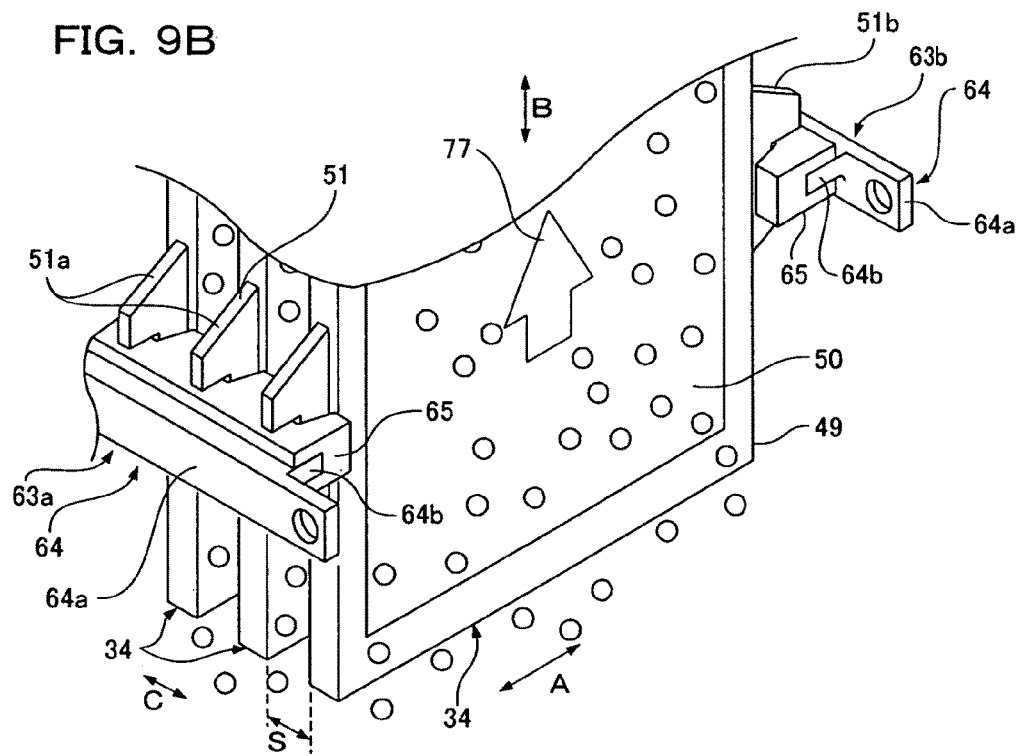
FIG. 9B is an enlarged perspective view of the mating portion of the slit of the space maintaining member and the recess of the supporting portion of the membrane cartridge of the submerged membrane separator in the first embodiment and shows a state in which air diffusion is performed.
Figure 10:
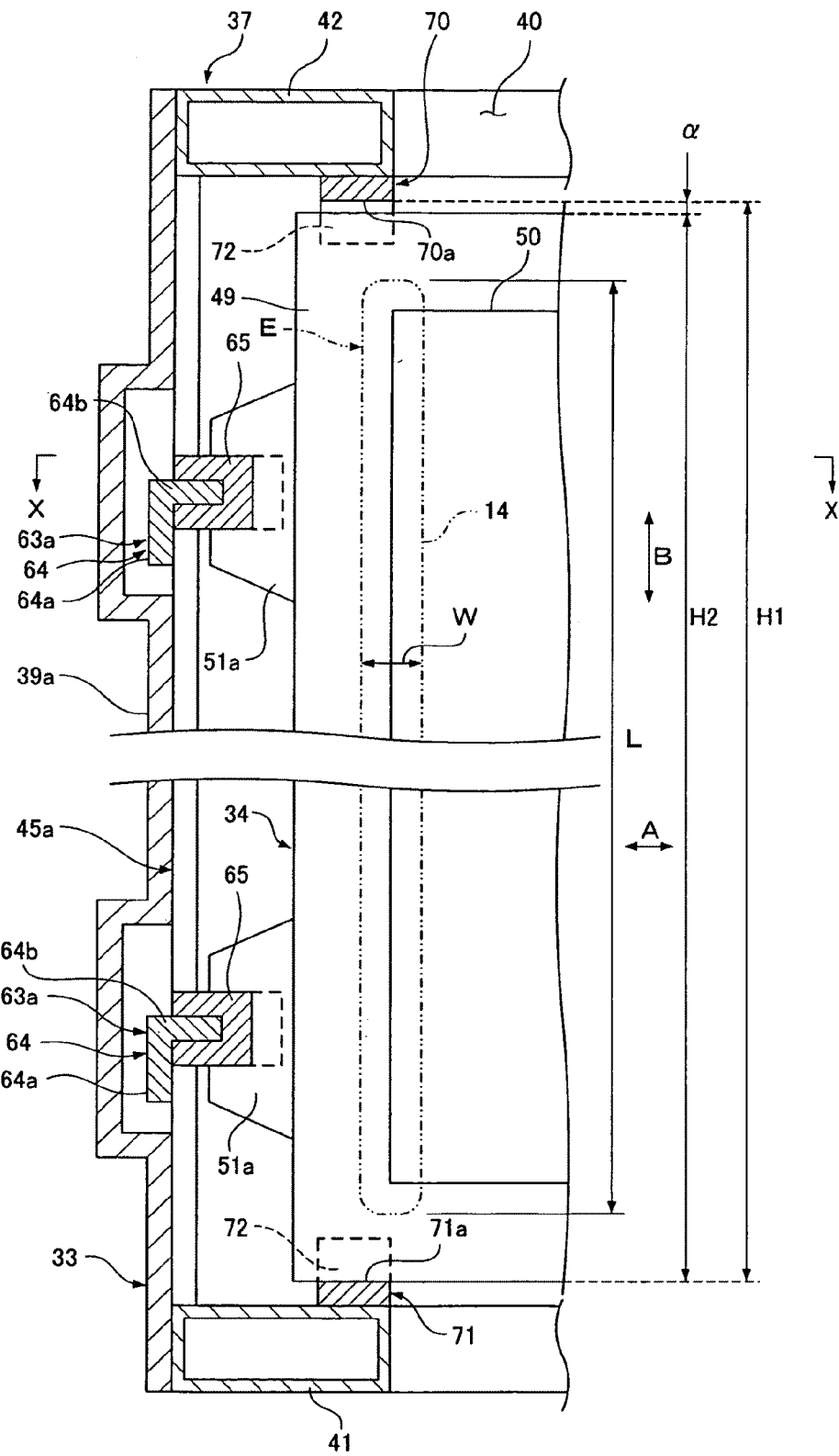
FIG. 10 is a longitudinal sectional view of left or right one side of the casing and left or right one side of the membrane cartridge of the submerged membrane separator in the first embodiment.
Figure 12A:
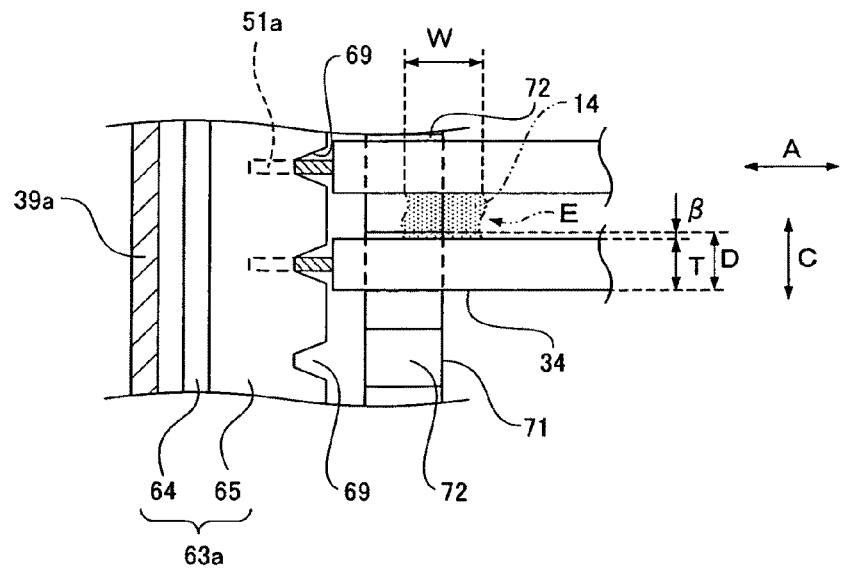
FIG. 12A is a view take along arrows X-X in FIG. 10.

As shown in FIGS. 9, 10, and 12A, the supporting portions 51a and 51b of the membrane cartridge 34 fit into the slits 69 of the holding member 65 in the recesses 52. In this state, the space S in the arrangement direction C between the membrane cartridges 34 is maintained at the predetermined space by the space maintaining members 63a and 63b. The recesses 52 of the supporting portions 51a and 51b are fit in and set in contact with the slits 69 of the holding member 65 in the width direction A (left-right direction), the up-down direction B, and the arrangement direction C (front-rear direction).

Operations in the configuration explained above are explained below.

(1) During a filtration operation, as shown in FIG. 1, the inside of the membrane cartridges 34 is depressurized while air is diffused from the air diffuser 36, whereby sludge or the like in the liquid to be treated 35 is caught by the filtration membrane 50 of the membrane cartridge 34. A liquid permeating through the filtration membranes 50 and flowing into the inner side of the membrane cartridges 34 is collected as treated water 79 in the water collecting pipe 55 from the water intake nozzles 53 through the connection pipes 56.

In this case, as shown in FIG. 9B, the upflow 77 is generated between the membrane cartridges 34 by bubbles of air diffused from the air diffuser 36. The matter adhering to the membrane cartridges 34 is removed by the upflow 77.

As shown in FIGS. 3 and 4, since the water intake nozzles 53 are provided at the upper ends on both sides of the filtration plate 49, the upflow 77 smoothly flows without hitting the connection pipes 56. Therefore, membrane surface deposit on the membrane cartridge 34 is sufficiently removed. Since the upflow 77 does not hit against the connection pipes 56, vibration of the connection pipes 56 is reduced and it is possible to prevent a crack from occurring around the water intake nozzles 53.

As shown in FIG. 9B, during the filtration operation, the holding members 65 of the space maintaining members 63a and 63b are deformed by receiving a force of the upflow 77 and a buoyant force acting on the membrane cartridge 34, whereby the membrane cartridge 34 is slightly buoyed up from the lower inner surface 71a of the guiding groove 72 of the lower guiding member 71 and actively vibrates in the up-down direction B and the arrangement direction C. Since the matter adhering to the membrane cartridge 34 is removed by this vibration, the cleaning effect of the membrane cartridge 34 is further improved.

Figure 11:
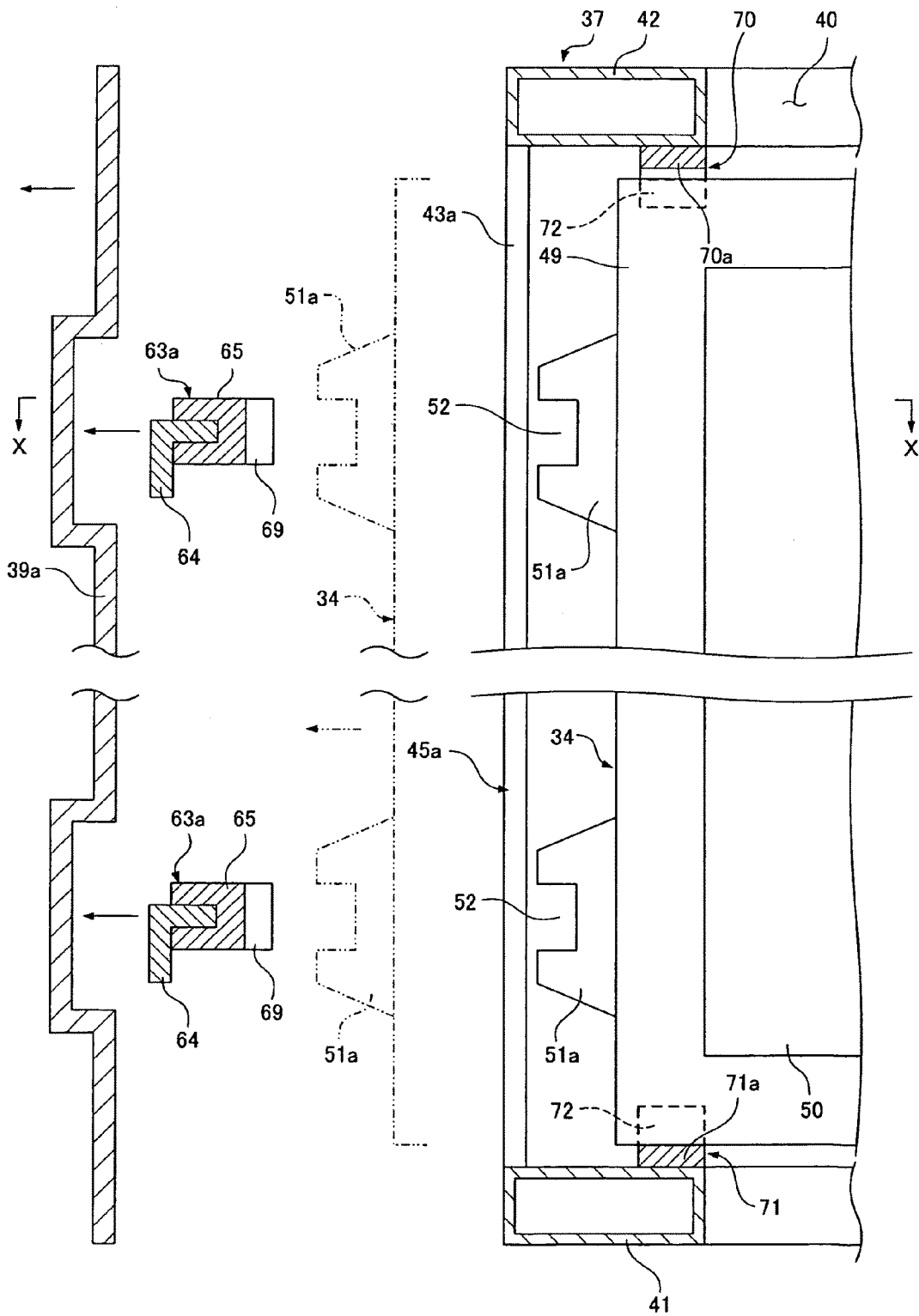
FIG. 11 is a longitudinal sectional view of left or right one side of the casing and left or right one side of the membrane cartridge of the submerged membrane separator in the first embodiment and shows a state in which the side cover and a supporting member are removed from the casing.

(2) When the membrane cartridge 34 is removed in maintenance or the like, after the air diffusion by the air diffuser 36 is stopped, the filtration operation is stopped, and a liquid to be treated 74 in the treatment tank 32 is discharged, as shown in FIGS. 2 and 11, the bolts 46 are unscrewed to remove the one side panel 39a from the frame body 37 and open the one side opening 45a.

Figure 12B:
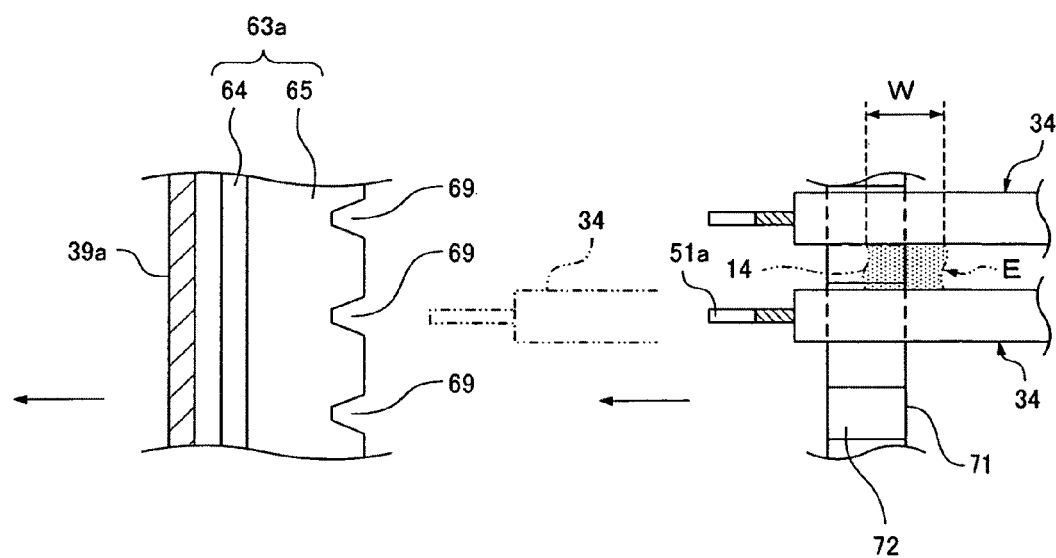
FIG. 12B is a view taken along arrows X-X in FIG. 11.

Subsequently, the bolts 66 are unscrewed to remove the space maintaining members 63a on one of the left and right from the frame body 37. Consequently, as shown in FIGS. 11 and 12B, the supporting portions 51a on one of the left and right of the membrane cartridge 34 disengage from the slits 69 of the space maintaining members 63a on one of the left and right. Thereafter, as indicated by the virtual lines of FIGS. 2 and 11, the membrane cartridge 34 can be pulled out from the inside of the casing 33 for membranes in the width direction A of the membrane cartridge 34 through the one side opening 45a and taken out to the outer side of the casing 33. At this point, the recesses 52 of the supporting portions 51b on the other of the left and right of the membrane cartridge 34 disengage from the slits 69 of the space maintaining members 63b on the other of the left and right. The membrane cartridge 34 is pulled out in the width direction A while being guided by the upper and lower guiding grooves 72.

Consequently, it is possible to easily pull out the membrane cartridge 34 from the inside of the casing 33 in the width direction A (left-right sideward direction). As shown in FIG. 1, it is also possible to keep low the height of a space 73 above the casing 33. It is possible to reduce dangerous work in a high place and safety is improved.

(3) When the membrane cartridge 34 is attached, as shown in FIGS. 2 and 11, the membrane cartridge 34 is inserted from the outer side of the casing 33 in the width direction A of the membrane cartridge 34 through the one side opening 45a. At this point, the membrane cartridge 34 is inserted in the width direction A while being guided by the upper and lower guiding grooves 72. The recesses 52 of the supporting portions 51b on the other of the left and right of the membrane cartridge 34 are inserted into the slits 69 of the space maintaining members 63b on the other of the left and right.

Figure 8B:
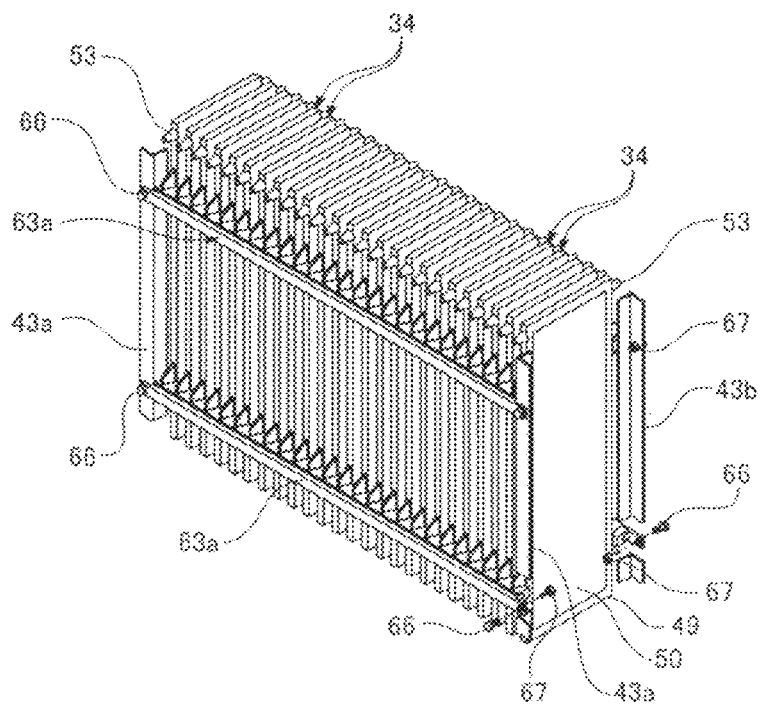
FIG. 8B is a perspective view of the membrane cartridge restrained by the space maintaining member of the submerged membrane separator in the first embodiment.

Subsequently, as shown in FIG. 8B, the bolts 66 are screwed to attach the space maintaining members 63a on one of the left and right to the vertical frames 43a on one of the left and right of the frame body 37. Consequently, as shown in FIGS. 10 and 12A, the recesses 52 of the supporting portions 51a on one of the left and right of the membrane cartridges 34 are inserted into the slits 69 of the space maintaining members 63a on one of the left and right.

Thereafter, the bolts 46 are screwed to attach the one side panel 39a to the frame body 37 as shown in FIGS. 10 and 12A to close the one side opening 45a. Thus, the membrane cartridge 34 is housed in the inside of the casing 33. The space S between the membrane cartridges 34 is accurately maintained at the predetermined space by the space maintaining members 63a and 63b.

In a state in which the filtration operation is stopped and the liquid to be treated 74 in the treatment tank 32 is drained, the force of the upflow 77 and the buoyant force do not act on the membrane cartridge 34. As shown in FIG. 9A, the holding members 65 of the space maintaining members 63a and 63b are deformed by receiving own weight 78 of the membrane cartridge 34. Consequently, as shown in FIG. 10, the membrane cartridge 34 sinks and is supported by the space maintaining members 63a and 63b and the lower guiding members 71.

As explained above, the one side opening 45a of the casing 33 for membranes is closed by the one side panel 39a and the other side opening 45b is closed by the other side panel 39b. Therefore, during the filtration operation, it is possible to prevent bubbles of air diffused from the air diffuser 36 from being released to the outside of the casing 33 through the side openings 45a and 45b.

(4) During the filtration operation, as explained above in (1), the upflow 77 along the membrane surface of the membrane cartridge 34 is generated by diffusing air from the air diffuser 36. However, the flow rate of this upflow 77 falls as being closer to the inner side surface of the side panels 39a and 39b of the casing 33, i.e., closer to both sides of the membrane cartridge 34. Therefore, as shown in FIGS. 10 and 12A, in some case, sludge 14 clogs between the sides of the membrane cartridges 34 adjacent to each other.

In this case, a clogging portion E of the sludge 14 occurs substantially over the entire length in the up-down direction B on both sides of the membrane cartridge 34. A width W in the sideward direction of the clogging portion E of the sludge 14 is extremely small compared with a length L in the up-down direction of the clogging portion E of the sludge 14.

Figure 30A:
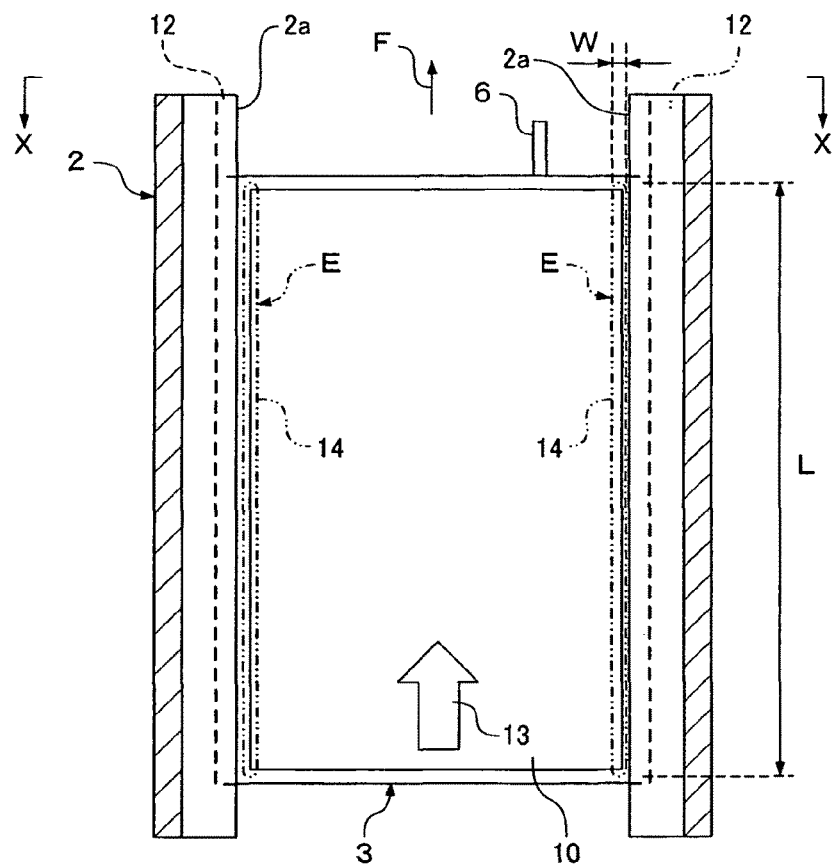
FIG. 30A is a front view showing a clogging portion of sludge in a membrane cartridge of the submerged membrane separator in the prior art.
Figure 30B:
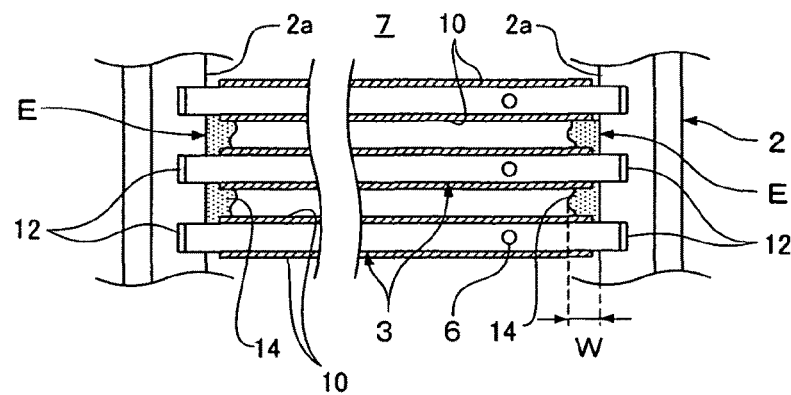
FIG. 30B is a view take along arrows X-X in FIG. 30A.

Therefore, as explained above in (2), when the membrane cartridge 34 is removed from the inside of the casing 33 in maintenance or the like, by removing the membrane cartridge 34 from the width direction A, the direction in which the membrane cartridge 34 is removed is the same as the direction of the width W of the clogging portion E of the sludge 14 rather than the direction of the length L of the clogging portion E of the sludge 14 (see FIG. 30), unlike in the prior art. Therefore, resistance in pulling out of the membrane cartridge 34 is generated over the width W of the clogging portion E of the sludge 14. However, since the width W of the clogging portion E of the sludge 14 is extremely small compared with the length L as explained above, at a time when the membrane cartridge 34 is pulled out by the width W, the sludge 14 in the clogging portion E is sheared and smashed. Consequently, compared with the prior art, it is possible to reduce labor required for removing the membrane cartridge 34 from the inside of the casing 33.

(5) When the properties of the liquid to be treated 74 are deteriorated and the sludge 14 clogs between the membrane cartridges 34 or alternatively when an abnormal operation such as continuation of the filtration operation is performed in a state in which the air diffuser 36 is stopped, an operator can also jet a high-pressure cleaning liquid 75 from an injection nozzle 76 of a cleaning device (not shown) to clean the membrane cartridges 34. In this case, after the air diffusion by the air diffuser 36 is stopped, the filtration operation is stopped, and the liquid to be treated 74 in the treatment tank 32 is discharged, as shown in FIG. 2, the bolts 46 are unscrewed to remove the one side panel 39a from the frame body 37 and open the one side opening 45a.

Figure 7:
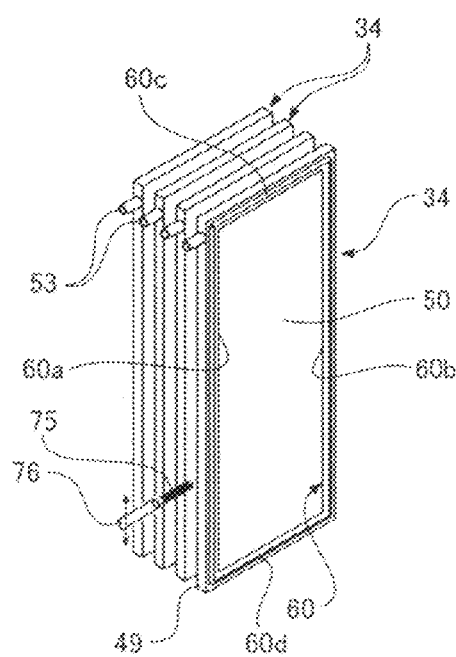
FIG. 7 is a perspective view showing a method of jetting a cleaning liquid on and cleaning the membrane cartridge of the submerged membrane separator in the first embodiment.

Subsequently, as shown in FIG. 7, the injection nozzle 76 is opposed to the one side opening 45a and the high-pressure cleaning liquid 75 is jetted from the injection nozzle 76 to the membrane cartridges 34. Consequently, the high-pressure cleaning liquid 75 is jetted to between the membrane cartridges 34 through the one side opening 45a, the sludge 14 clogging spaces between the membrane cartridges 34 is smashed and removed, and the membrane surfaces of the membrane cartridges 34 are cleaned.

In this case, as shown in FIGS. 5 and 6, the cleaning liquid 75 hits the projecting portion 60a on one side immediately before the left or right one side edge of the filtration membrane 50 and the direction of the cleaning liquid 75 is bent by the projecting portion 60a on one side. Therefore, it is possible to prevent the cleaning liquid 75 from directly hitting the left or right one side edge of the filtration membrane 50. Consequently, it is possible to prevent the left or right one side edge of the filtration membrane 50 from peeling off from the filtration plate 49.

In the embodiment, as shown in FIG. 2, the one side panel 39a and the one space maintaining member 63a are removed from the frame body 37 to open the one side opening 45a and remove the membrane cartridge 34 from and insert the membrane cartridge 34 into the casing 33 through the one side opening 45a. However, as shown in FIG. 3, the other side panel 39b and the other space maintaining member 63b may be removed from the frame body 37 to remove the membrane cartridge 34 from and insert the membrane cartridge 34 into the casing 33 through the other side opening 45b.

In the embodiment, as shown in FIG. 2, the one side panel 39a is removed from the frame body 37 to open the one side opening 45a and jet the cleaning liquid 75 from the one side opening 45a to the spaces between the membrane cartridges 34. However, as shown in FIG. 3, the other side panel 39b may be removed from the frame body 37 to open the other side opening 45b and jet the cleaning liquid 75 from the other side opening 45b to the spaces between the membrane cartridges 34. In this case, since the cleaning liquid 75 hits the projecting portions 60b on the other side of the membrane cartridges 34, it is possible to prevent the cleaning liquid 75 from directly hitting the left or right other side edges of the filtration membranes 50. Alternatively, the cleaning liquid 75 may be jetted from an upper opening 40 of the casing 33 to the spaces between the membrane cartridges 34. In this case, since the cleaning liquid 75 hits the projecting portions 60c above the membrane cartridges 34, it is possible to prevent the cleaning liquid 75 from directly hitting the upper edges of the filtration membranes 50.

In the embodiment, as shown in FIG. 3, the water intake nozzles 53 are provided in pairs horizontally in the membrane cartridge 34 and the water collecting pipes 55 are provided in pairs horizontally in the frame body 37. However, only one of the left and right water intake nozzles 53 may be provided and only one of the left and right water collecting pipes 55 may be provided.

In the embodiment, as shown in FIG. 3, the side panels 39a and 39b are detachably provided in the frame body 37. However, the side panels 39a and 39b may be openably and closably provided in the frame body 37.

Figure 13:
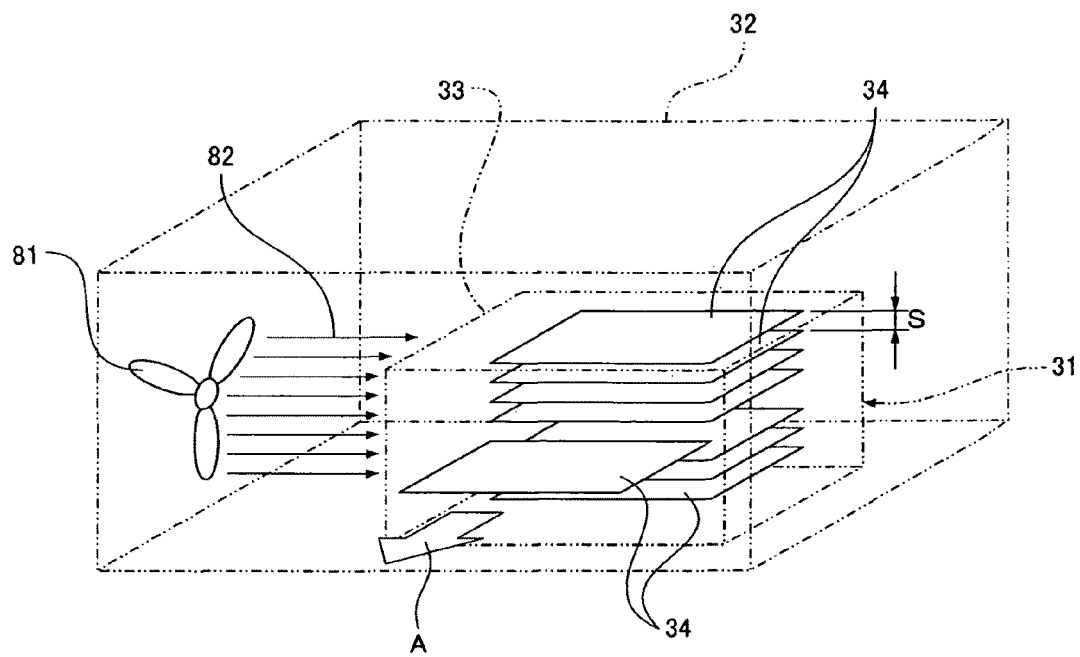
FIG. 13 is a schematic diagram showing the configuration of a submerged membrane separator in a second embodiment of the present invention.

In the embodiment, as shown in FIG. 1, the air diffuser 36 is used as an example of the flow generating device, the upflow 77 is formed as an example of the flow in one direction, and the plurality of membrane cartridges 34 are arrayed in parallel at spaces S in the front-rear direction. However, the present invention is not limited to such a configuration. For example, as a second embodiment, the present invention may be a submerged membrane separator 31 in which, as shown in FIG. 13, a rotary vane 81 is used as another example of the flow generating device, a horizontal current 82 in the front-rear direction is formed as an example of the flow in one direction, and a plurality of membrane cartridges 34 are arrayed in parallel at spaces S in the up-down direction.

Figure 14:
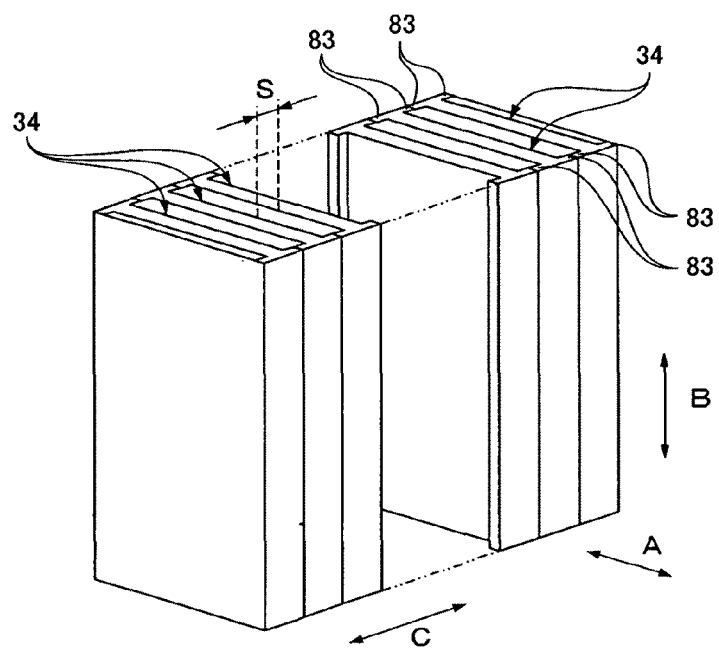
FIG. 14 is a schematic diagram showing the configuration of a submerged membrane separator in a third embodiment of the present invention.

In the embodiment explained above, as shown in FIG. 2, the membrane cartridges 34 are arranged in the inside of the casing 33. However, the present invention is not limited to such a configuration. For example, as a third embodiment, as shown in FIG. 14, projecting wall portions 83 may be formed on the sides of the membrane cartridges 34 and the membrane cartridges 34 may be arranged in contact with one another to use the wall portions 83 instead of the side panels 39a and 39b. In this case, a casing has a structure excluding the side panels 39a and 39b. The space S between the membrane cartridges 34 is maintained at a predetermined space by the wall portions 83.

A fourth embodiment in the present invention is explained below with reference to FIGS. 15 to 17.

The same members as the members explained in the first embodiment are denoted by the same reference numerals and signs and an explanation of the members is omitted.

Figure 15:
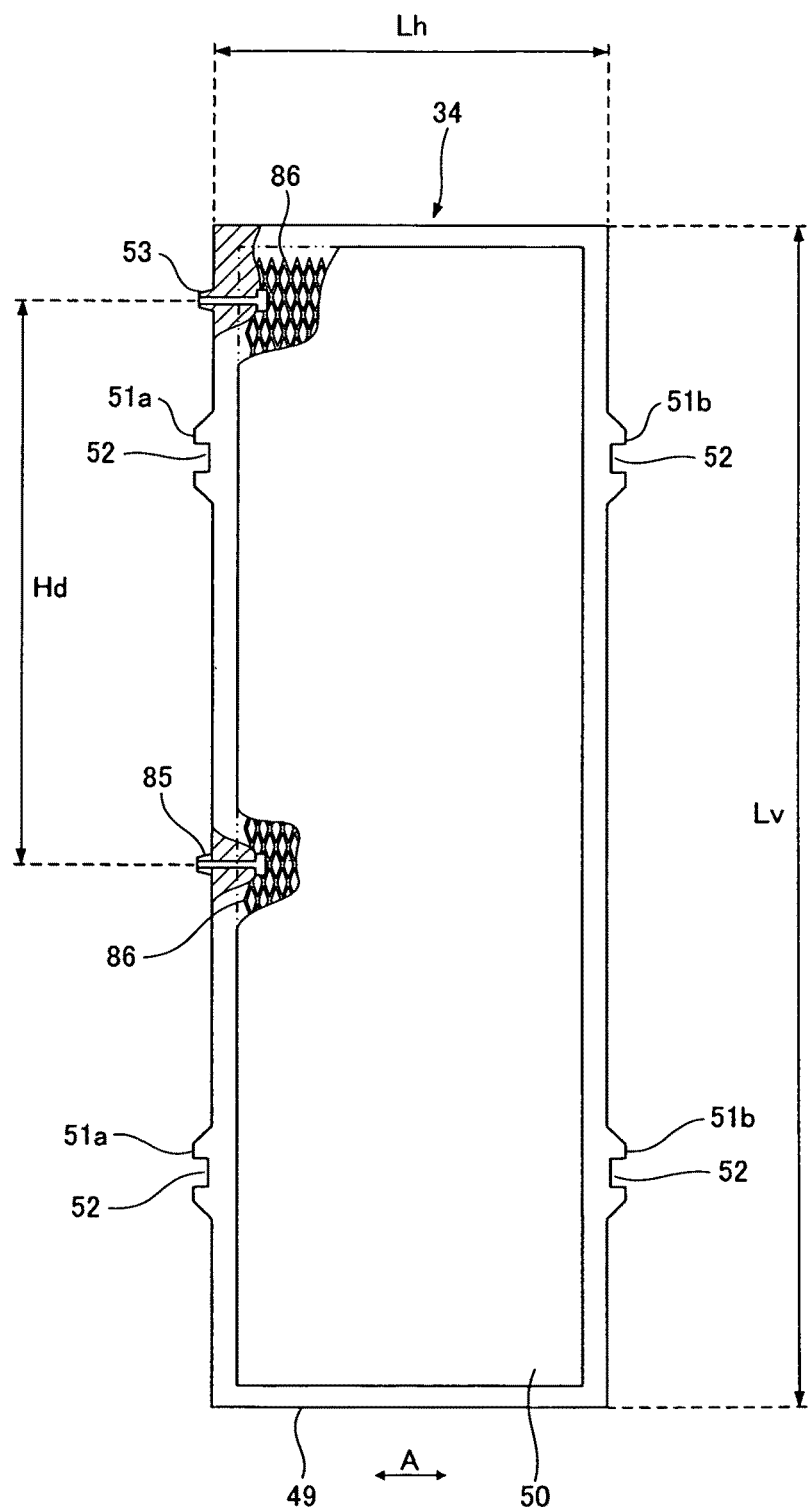
FIG. 15 is a partially cut-out front view of a membrane cartridge of a submerged membrane separator in a fourth embodiment of the present invention.

As shown in FIG. 15, a membrane cartridge 34 is formed in an elongated rectangle. A plurality of water intake nozzles 53 and 85 (an example of water intake portions) for sucking treated water obtained by a filtration membrane 50 are provided on one of both sides of a filtration plate 49 of the membrane cartridge 34 orthogonal to a width direction A. The first water intake nozzle 53 is located at the upper end of one side of the membrane cartridge 34 and the second water intake nozzle 85 is located between both upper and lower ends of one side thereof. The height from the lower side of the membrane cartridge 34 to the second water intake nozzle 85 is smaller than that from the lower side of the membrane cartridge 34 to the first water intake nozzle 53.

The ratio (=Lv/Lh) of a length Lv in the vertical direction (up-down direction) of the membrane cartridge 34 and a length Lh in the sideward direction (width direction A) is set to 3. A difference Hd between the heights of the first water intake nozzle 53 and the second water intake nozzle 85 is set to be equal to or larger than the length Lh in the sideward direction of the membrane cartridge 34 (i.e., Hd≥Lh).

Permeate channels 86 for communicating with the water intake nozzles 53 and 85 are respectively formed on both front and rear sides of the filtration plate 49. The permeate channels 86 are covered with the filtration membrane 50.

Figure 16:
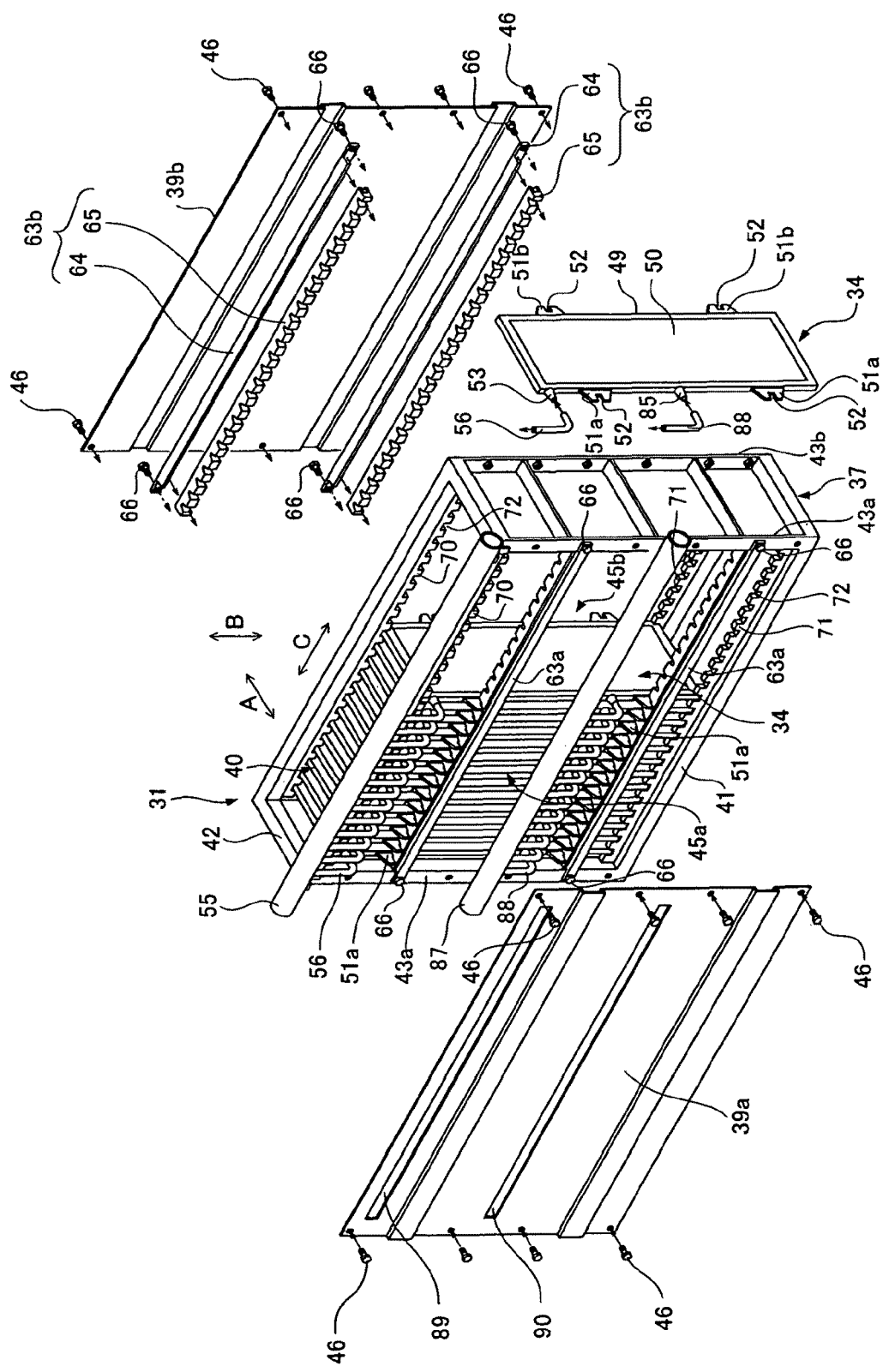
FIG. 16 is an exploded perspective view showing the configuration of the submerged membrane separator in the fourth embodiment.
Figure 17:
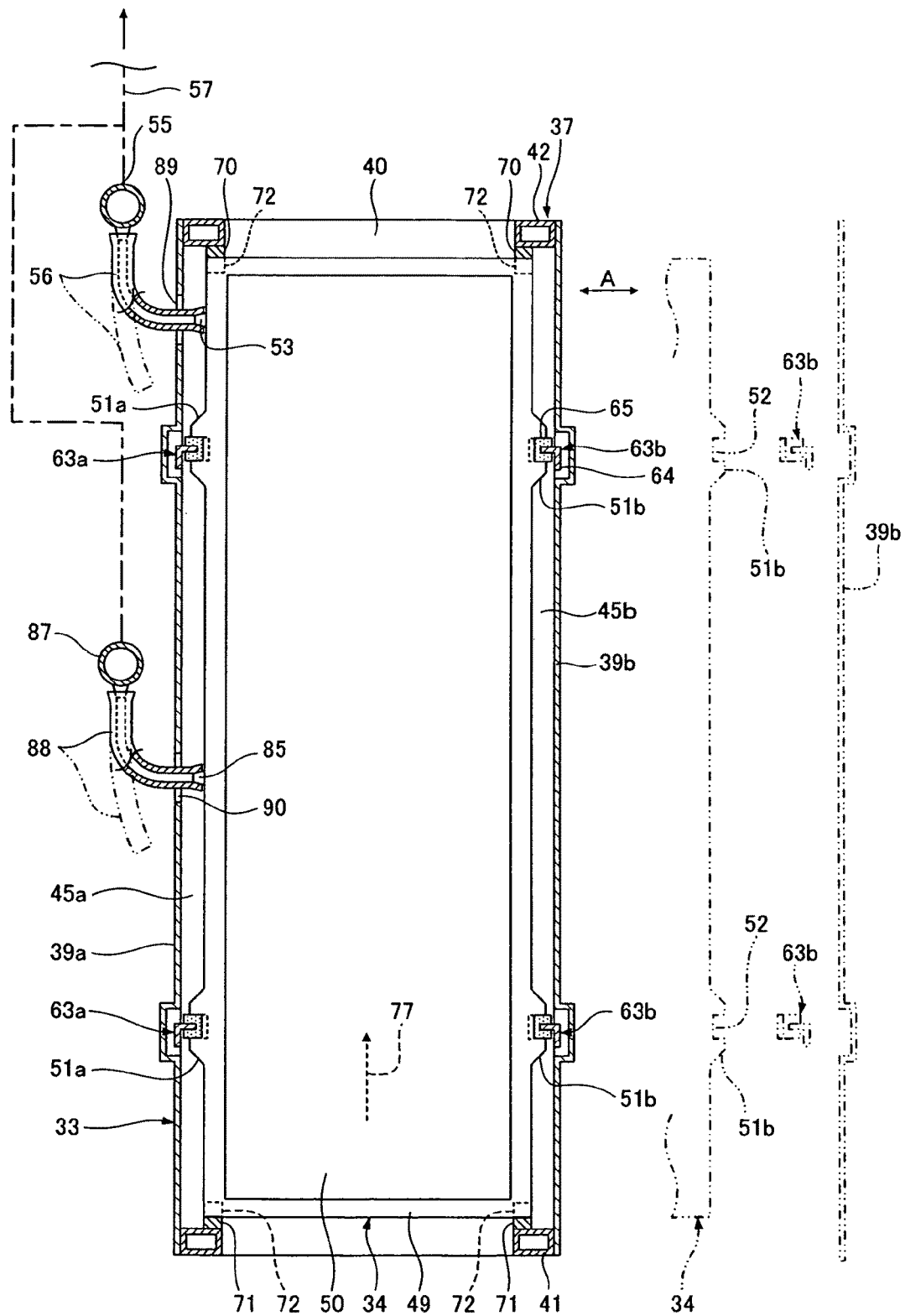
FIG. 17 is a longitudinal sectional view of the submerged membrane separator in the fourth embodiment.

As shown in FIGS. 16 and 17, a pair of upper and lower water collecting pipes 55 and 87 for collecting treated water sucked from the water intake nozzles 53 and 85 of the membrane cartridges 34 are provided in the front-rear direction on left or right one side of a frame body 37. The first water collecting pipe 55 and the first water intake nozzle 53 are connected via a first connection pipe 56 having flexibility. The second water collecting pipe 87 and the second water intake nozzle 85 are connected via a second connection pipe 88 having flexibility.

A lead-out pipe 57 for leading out treated water is connected to the water collecting pipes 55 and 87. A suction pump (not shown) for generating a suction force for sucking the treated water is provided in the lead-out pipe 57. A suction force may be generated by using the head pressure of a liquid to be treated 35 in a treatment tank 32 as a filtration driving pressure without using the suction pump.

Opened windows 89 and 90 are formed in a plurality of upper and lower places in a left or right one side panel 39a. The first opened window 89 is located at the upper end of the side panel 39a and opposed to the first water intake nozzle 53. The second opened window 90 is located between the upper and lower ends of the side panel 39a and opposed to the second water intake nozzle 85. The first connection pipe 56 is inserted through the first opened window 89 and the second connection pipe 88 is inserted through the second opened window 90.

Operations in the configuration explained above are explained below.

(1) During a filtration operation, the inside of the membrane cartridges 34 is depressurized while air is diffused from an air diffuser 36, whereby sludge or the like in the liquid to be treated 35 is caught by the filtration membrane 50 of the membrane cartridge 34. A liquid permeating through the filtration membrane 50 and flowing into the inner side of the membrane cartridges 34 flows through the permeate channel 86 as treated water 79, is sucked from the first and second water intake nozzles 53 and 85, and is collected in the first and second water collecting pipes 55 and 87 through the first and second connection pipes 56 and 88.

The first and second water intake nozzles 53 and 85 are provided on one side of the membrane cartridge 34 and are located at different heights. Therefore, a sufficient suction pressure acts on the entire membrane cartridge 34. Consequently, it is possible to obtain the treated water 79 (permeate) using the entire filtration membrane 50 effectively.

When the difference Hd between the heights of the first water intake nozzle 53 and the second water intake nozzle 85 is too small, it is likely that areas where permeate can be obtained from the filtration membrane 50 by the respective water intake nozzles 53 and 85 overlap each other and the entire filtration membrane 50 cannot be effectively used. To cope with such a problem, as shown in FIG. 15, the difference Hd between the heights of the first water intake nozzle 53 and the second water intake nozzle 85 is set to be equal to or larger than the length Lh in the sideward direction of the membrane cartridge 34. Thus, it is possible to considerably reduce the overlap (interference) of the areas where permeate can be obtained from the filtration membrane 50 by the respective water intake nozzles 53 and 85 and to sufficiently draw out the ability of the membrane cartridge 34.

In this case, the matter adhering to the membrane surface of the membrane cartridge 34 is removed by upflow 77 generated by bubbles of air diffused from the air diffuser 36. Since the membrane cartridge 34 is vertically long, it is possible to effectively use the air diffusion by the air diffuser 36.

As shown in FIGS. 15 and 17, the first and second water intake nozzles 53 and 85 are provided on one side of the membrane cartridge 34. Therefore, the upflow 77 smoothly flows without hitting the first and second connection pipes 56 and 88. Thus, matter adhering to the membrane surfaces of the membrane cartridges 34 is sufficiently removed. Since the upflow 77 does not hit the first and second connection pipes 56 and 88, vibration of the connection pipes 56 and 88 is reduced and it is possible to prevent a crack from occurring around the water intake nozzles 53 and 85.

In some case, a part of air (gas) diffused from the air diffuser 36 passes through the filtration membrane 50 and is sucked into the inner side of the membrane cartridge 34 or a part of dissolved gas in permeate (treated water) permeating through the filtration membrane 50 and flowing into the inner side of the membrane cartridge 34 vaporizes. However, since the first water intake nozzle 53 is located at the upper end of one side of the membrane cartridge 34, the gas such as air is sucked from the first intake nozzle 53 and is discharged from the inner side of the membrane cartridge 34. Consequently, it is possible to prevent the gas from being retained on the inner side at the upper end of the membrane cartridge 34.

(2) When the membrane cartridge 34 is removed in maintenance or the like, after the air diffusion by the air diffuser 36 is stopped, the filtration operation is stopped, and the water to be treated 35 in the treatment tank 32 is discharged, as indicated by the virtual line of FIG. 17, first, the distal end of the first connection pipe 56 is removed from the first intake nozzle 53 by using the first opened window 89 of the one side panel 39a and the distal end of the second connection pipe 88 is removed from the second water intake nozzle 85 by using the second opened window 90.

As indicated by the virtual lines of FIGS. 16 and 17, bolts 46 are unscrewed to remove the other side panel 39b from the frame body 37 and open the other side opening 45b. Thereafter, bolts 66 are unscrewed to remove the left or right other space maintaining member 63b from the frame body 37. The membrane cartridge 34 is pulled out from the inside of a casing 33 in the width direction A of the membrane cartridge 34 through the other side opening 45b and taken out to the outer side of the casing 33. At this point, the membrane cartridge 34 is pulled out in the width direction A while being guided by upper and lower guiding grooves 72. Consequently, it is possible to easily pull out the membrane cartridge 34 from the inside of the casing 33 in the width direction A (left-right sideward direction).

(3) When the membrane cartridge 34 is attached, as indicated by the solid line of FIG. 17, the membrane cartridge 34 is inserted from the outer side of the casing 33 in the width direction A of the membrane cartridge 34 through the other side opening 45b. At this point, the membrane cartridge 34 is inserted in the width direction A while being guided by the upper and lower guiding grooves 72. Subsequently, the bolts 66 are screwed to attach the left or right other space maintaining member 63b to the frame body 37.

Thereafter, the bolts 46 are screwed to attach the other side panel 39b to the frame body 37 as indicated by the solid line of FIG. 17 and the other side opening 45b is closed. Consequently, the membrane cartridge 34 is housed in the inside of the casing 33 and a space S between the membrane cartridges 34 is accurately maintained at a predetermined space by space maintaining members 63a and 63b.

Thereafter, as indicated by the solid line of FIG. 17, the distal end of the first connection pipe 56 is fit in and connected to the first water intake nozzle 53 by using the first opened window 89 of the one side panel 39a and the distal end of the second connection pipe 88 is fit in and connected to the second water intake nozzle 85 by using the second opened window 90.

In this way, since the water intake nozzles 53 and 85 are provided on one side of the membrane cartridge 34, the water intake nozzles 53 and 85 do not obstruct removal and insertion of the membrane cartridge 34. In the submerged membrane separator of the type for inserting a membrane cartridge into and removing the membrane cartridge from a casing from the up-down direction as in the prior art, when a plurality of water intake nozzles are provided on a side of the membrane cartridge, the water intake nozzles obstruct removal and insertion of the membrane cartridge.

In the embodiment, as shown in FIG. 15, the plurality of water intake nozzles 53 and 85 are provided on one side of the membrane cartridge 34. However, the water intake nozzles 53 and 85 may be provided on the opposite other side thereof. In this case, the water collecting pipes 55 and 87, the connection pipes 56 and 88, and the opened windows 89 and 90 are also located on the opposite other side. The one side panel 39a is removed and the membrane cartridge 34 is removed from and inserted into one side opening 45a.

A fifth embodiment in the present invention is explained below.

Figure 18:
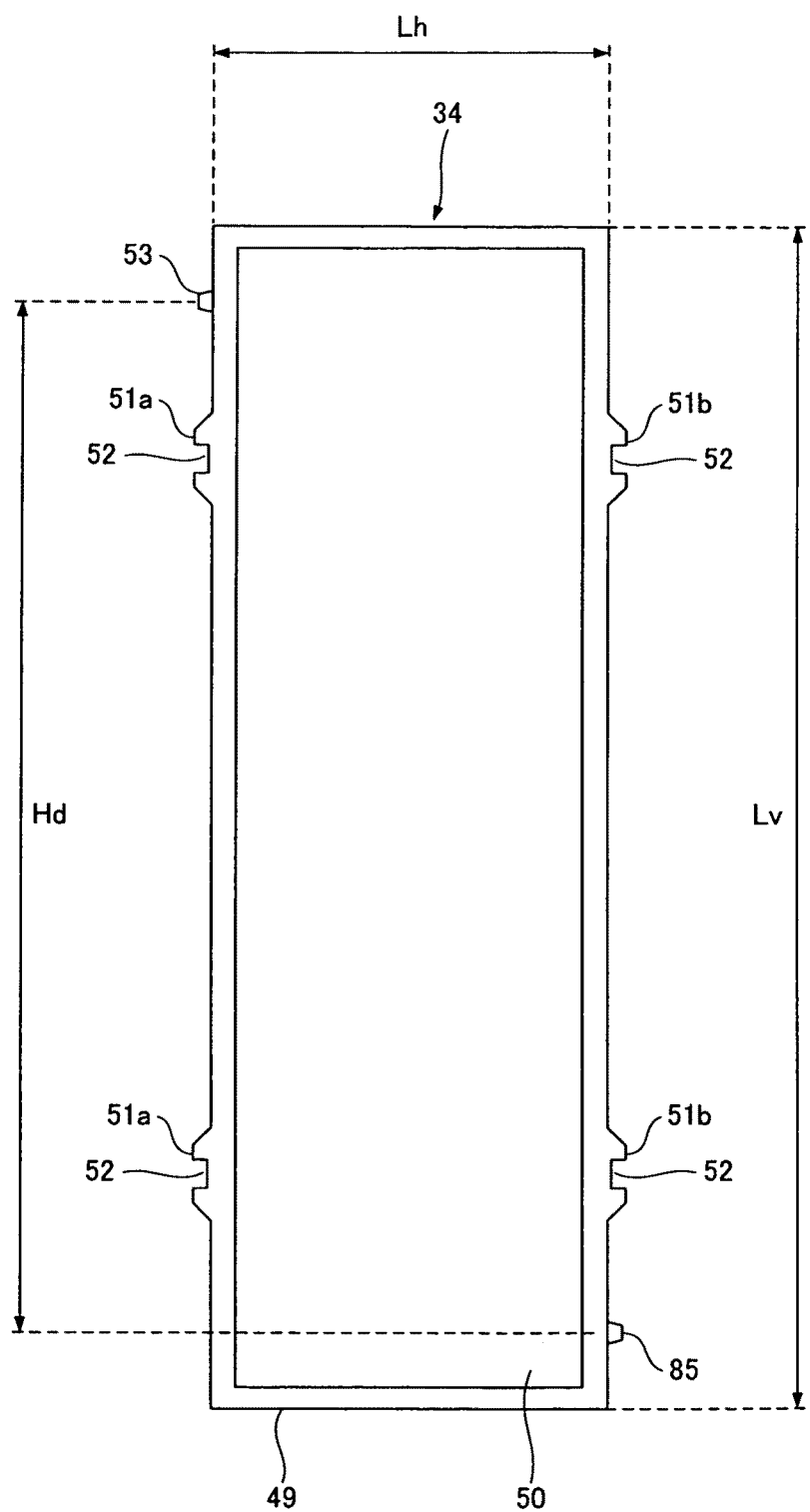
FIG. 18 is a front view of a membrane cartridge of a submerged membrane separator in a fifth embodiment of the present invention.
Figure 19:
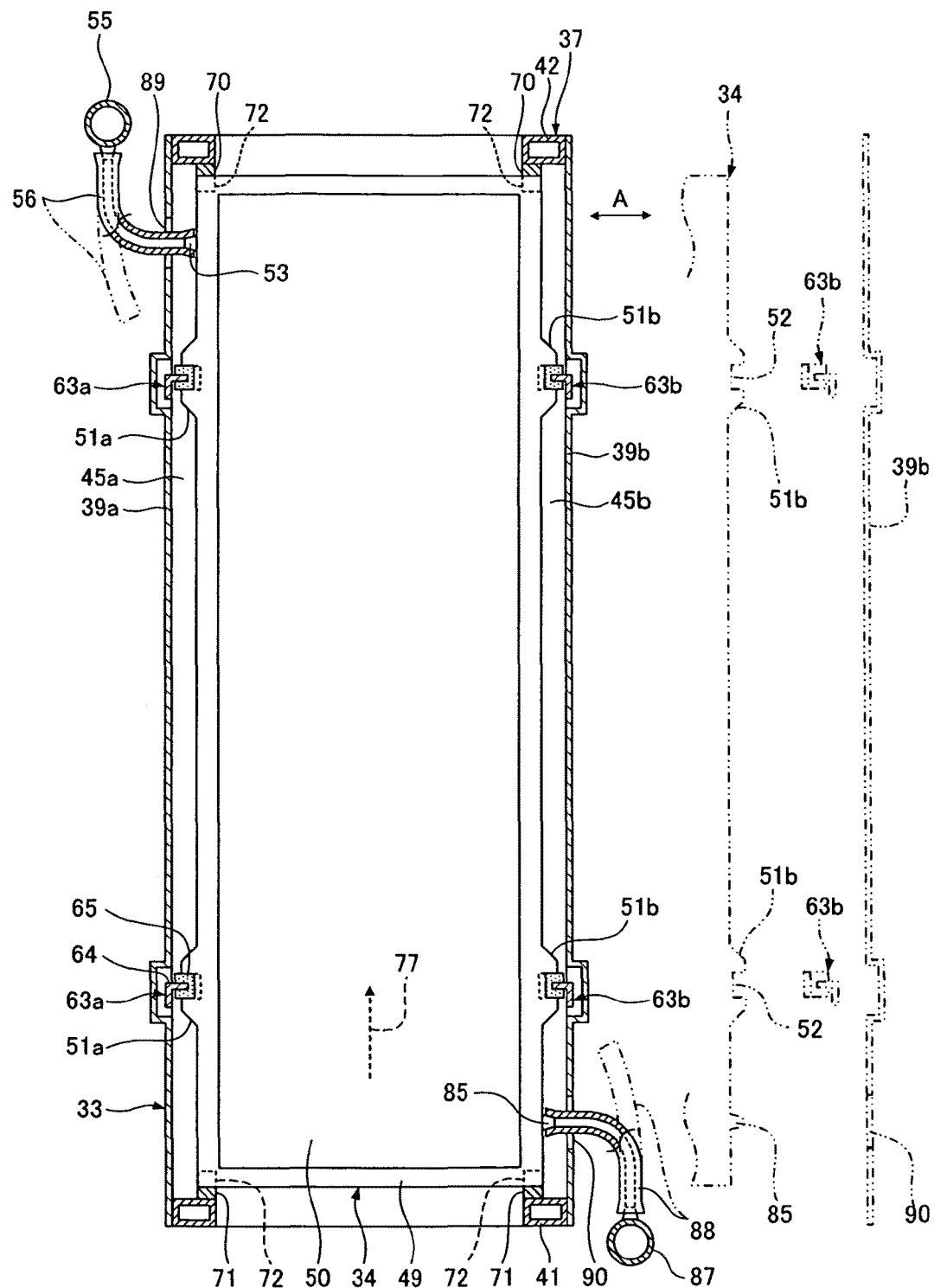
FIG. 19 is a longitudinal sectional view of the submerged membrane separator in the fifth embodiment.

As shown in FIGS. 18 and 19, a first water intake nozzle 53 is provided at the upper end of one of both sides of a filtration plate 49 of a membrane cartridge 34 orthogonal to a width direction A. A second water intake nozzle 85 is provided at the lower end of the other side thereof.

A ratio (=Lv/Lh) of a length Lv in the vertical direction (up-down direction) of the membrane cartridge 34 and a length Lh in the sideward direction (width direction A) thereof is set to 3. A difference Hd between the heights of the first water intake nozzle 53 and the second water intake nozzle 85 is set to be equal to or larger than the length Lh in the sideward direction of the membrane cartridge 34 (i.e., Hd≥Lh).

A first water collecting pipe 55 for collecting treated water sucked from the first water intake nozzle 53 is provided above left or right one side of a frame body 37. A second water collecting pipe 87 for collecting treated water sucked from the second water intake nozzle 85 is provided below the left or right other side of the frame body 37. The first water collecting pipe 55 and the first water intake nozzle 53 are connected via a first connection pipe 56. The second water collecting pipe 87 and the second water intake nozzles 85 are connected via a second connection pipe 88.

A first opened window 89 is formed at the upper end of left or right one side panel 39a and a second opened window 90 is formed at the lower end of the other side panel 39b. The first connection pipe 56 is inserted through the first opened window 89 and the second connection pipe 88 is inserted through the second opened window 90.

Operations in the configuration explained above are explained below.

(1) The first and second water intake nozzles 53 and 85 are provided on both sides of the membrane cartridge 34 and are located at different heights. Therefore, a sufficient suction pressure acts on the entire membrane cartridge 34. Consequently, it is possible to obtain treated water (permeate) effectively using an overall filtration membrane 50.

When the difference Hd between the heights of the first water intake nozzle 53 and the second water intake nozzle 85 is too small, it is likely that areas where permeate can be obtained from the filtration membrane 50 by the respective water intake nozzles 53 and 85 overlap each other and the entire filtration membrane 50 cannot be effectively used. To cope with such a problem, the difference Hd between the heights of the first water intake nozzle 53 and the second water intake nozzle 85 is set to be equal to or larger than the length Lh in the sideward direction of the membrane cartridge 34. Consequently, it is possible to considerably reduce the overlap (interference) of the areas where the permeate can be obtained from the filtration membrane 50 by the respective water intake nozzles 53 and 85 and to sufficiently draw out the ability of the membrane cartridge 34.

Since the first and second water intake nozzles 53 and 85 are provided on both sides of the membrane cartridge 34, upflow 77 smoothly flows without hitting the first and second connection pipes 56 and 88. Consequently, matter adhering to the membrane surface of the membrane cartridge 34 is sufficiently removed. Vibration of the connection pipes 56 and 88 is reduced and it is possible to prevent a crack from occurring around the water intake nozzles 53 and 85.

(2) When the membrane cartridge 34 is removed in maintenance or the like, after air diffusion by an air diffuser 36 is stopped, a filtration operation is stopped, and a liquid to be treated 35 in a treatment tank 32 is discharged, first, as indicated by the virtual line of FIG. 19, the distal end of the first connection pipe 56 is removed from the first water intake nozzle 53 by using the first opened window 89 of the one side panel 39a and the distal end of the second connection pipe 88 is removed from the second water intake nozzle 85 by using the second opened window 90.

Subsequently, as indicated by the virtual line of FIG. 19, bolts 46 are unscrewed to remove the other side panel 39b from the frame body 37 and open the other side opening 45b. Thereafter, bolts 66 are unscrewed to remove the left or right other space maintaining member 63b from the frame body 37. As indicated by the virtual line of FIG. 19, the membrane cartridge 34 can be pulled out from the inside of a casing 33 in the width direction A of the membrane cartridge 34 through the other side opening 45b and taken out to the outer side of the casing 33.

(3) When the membrane cartridge 34 is attached, as indicated by the solid line of FIG. 19, the membrane cartridge 34 is inserted from the outer side of the casing 33 in the width direction A of the membrane cartridge 34 through the other side opening 45b. Subsequently, the bolts 66 are screwed to attach the left or right other space maintaining member 63b to the frame body 37.

Thereafter, the bolts 46 are screwed and, as indicated by the solid line of FIG. 19, the other side panel 39b is attached to the frame body 37 and the other side opening 45b is closed. Consequently, the membrane cartridge 34 is housed in the inside of the casing 33 and a space S between the membrane cartridges 34 is accurately maintained at a predetermined space by space maintaining members 63a and 63b.

Thereafter, as indicated by the solid line of FIG. 19, the distal end of the first connection pipe 56 is fit in and connected to the first water intake nozzle 53 by using the first opened window 89 of the one side panel 39a and the distal end of the second connection pipe 88 is fit in and connected to the second water intake nozzle 85 by using the second opened window 90.

In this way, since the water intake nozzles 53 and 85 are provided on both sides of the membrane cartridge 34, the water intake nozzles 53 and 85 do not obstruct removal and insertion of the membrane cartridge 34. In the submerged membrane separator of the type for inserting a membrane cartridge into and removing the membrane cartridge from a casing from the up-down direction as in the prior art, when water intake nozzles are provided on both sides of the membrane cartridge, it is likely that the water intake nozzles obstruct removal and insertion of the membrane cartridge.

In the embodiment, as shown in FIG. 18, the first water intake nozzle 53 is provided at the upper end of one side of the membrane cartridge 34 and the second water intake nozzle 85 is provided at the lower end of the other side thereof. However, the first water intake nozzle 53 may be provided at the lower end of one side of the membrane cartridge 34 and the second water intake nozzle 85 may be provided at the upper end of the other side thereof. In this case, the upper and lower positions of the water collecting pipes 55 and 87, the connection pipes 56 and 88, and the opened windows 89 and 90 only have to be changed according to the upper and lower positions of the first and second water intake nozzles 53 and 85.

In this embodiment, as indicated by the virtual line of FIG. 19, the membrane cartridge 34 is removed from and inserted into the other side opening 45b. However, the membrane cartridges 34 may be removed from and inserted into one side opening 45a.

A sixth embodiment in the present invention is explained below.

Figure 20:
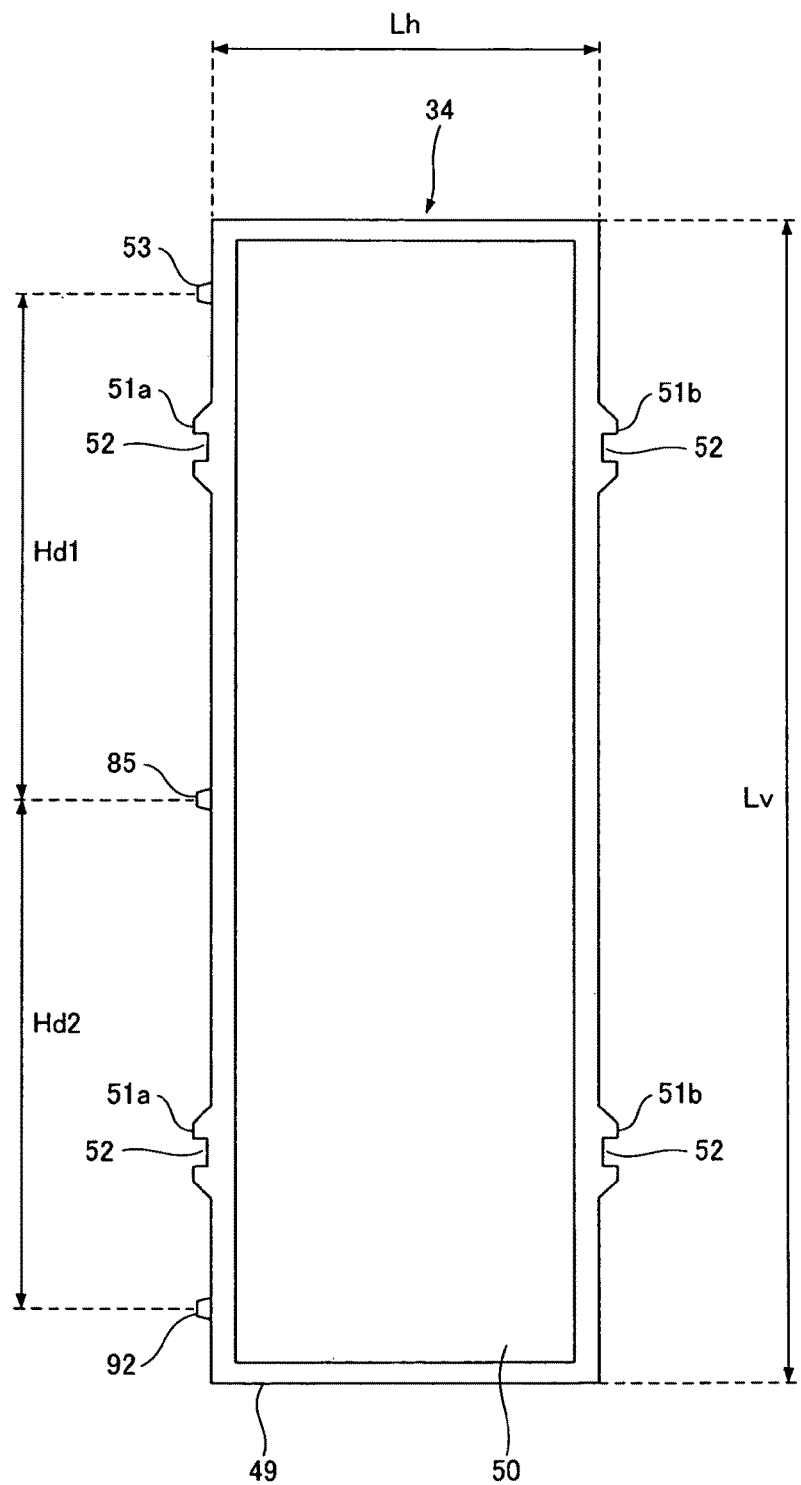
FIG. 20 is a front view of a membrane cartridge of a submerged membrane separator in a sixth embodiment of the present invention.
Figure 21:
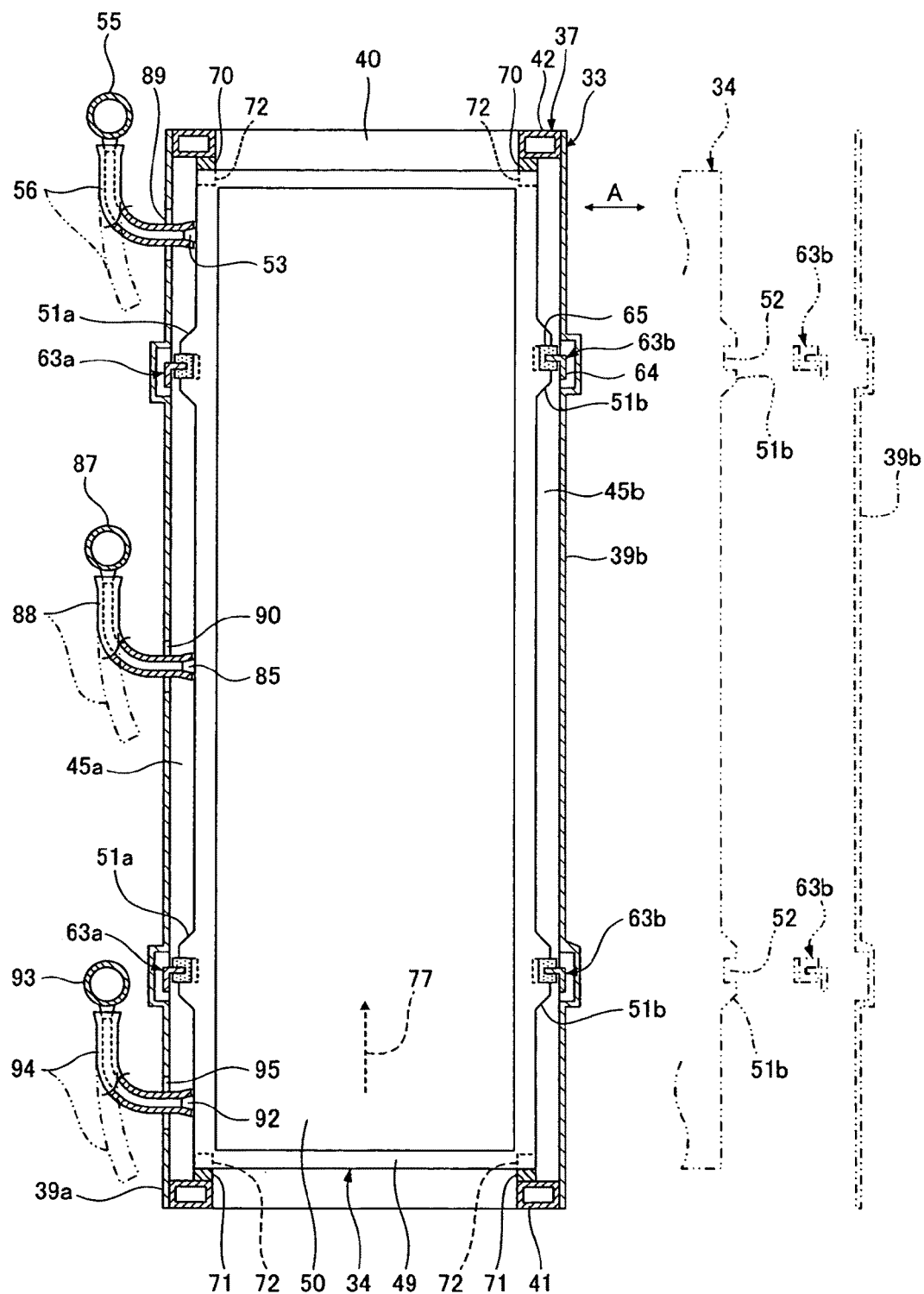
FIG. 21 is a longitudinal sectional view of the submerged membrane separator in the sixth embodiment.

The sixth embodiment is a modification of the fourth embodiment. As shown in FIGS. 20 and 21, first to third water intake nozzles 53, 85, and 92 (an example of water intake portions) are provided on one side of a filtration plate 49 of a membrane cartridge 34. Out of the first to third water intake nozzles 53, 85, and 92, the first water intake nozzle 53 is located at the upper end of one side of the membrane cartridge 34, the third water intake nozzle 92 is located at the lower end of one side of the membrane cartridge 34, and the second water intake nozzle 85 is located between the upper first water intake nozzle 53 and the lower third water intake nozzle 92.

A ratio (=Lv/Lh) of a length Lv in the vertical direction (up-down direction) of the membrane cartridge 34 and a length Lh in the sideward direction thereof (a width direction A) is set to 3. A difference Hd1 between the heights of the first water intake nozzle 53 and the second water intake nozzle 85 is set to be equal to or larger than the length Lh in the sideward direction of the membrane cartridge 34 (i.e., Hd1≥Lh). A difference Hd2 between the heights of the second water intake nozzle 85 and the third water intake nozzle 92 is set to be equal to or larger than the length Lh in the sideward direction of the membrane cartridge 34 (i.e., Hd2≥Lh).

First to third water collecting pipes 55, 87, and 93 are provided on one of the left and right sides of a frame body 37. The first water collecting pipe 55 and the first water intake nozzle 53 are connected via a first connection pipe 56. The second water collecting pipe 87 and the second water intake nozzle 85 are connected via a second connection pipe 88. The third water collecting pipe 93 and the third water intake nozzle 92 are connected via a third connection pipe 94.

First to third opened windows 89, 90, and 95 are formed in left or right one side panel 39a. Out of the first to third opened windows 89, 90, and 95, the first opened window 89 is located at the upper end of the side panel 39a and opposed to the first water intake nozzle 53. The third opened window 95 is located at the lower end of the side panel 39a and opposed to the third water intake nozzle 92. The second opened window 90 is located between the upper first opened window 89 and the lower third opened window 95 and opposed to the second water intake nozzle 85. The first connection pipe 56 is inserted through the first opened window 89, the second connection pipe 88 is inserted through the second opened window 90, and the third connection pipe 94 is inserted through the third opened window 95.

Operations in the configuration explained above are explained below.

(1) During a filtration operation, permeate permeating though a filtration membrane 50 and flowing into the inner side of the membrane cartridge 34 flows through a permeate channel 86 as treated water. The permeate is sucked from the first to third water intake nozzles 53, 85, and 92, is collected in the first to third water collecting pipes 55, 87, and 93 through the first to third connection pipes 56, 88, and 94, and is removed from the first to third water collecting pipes 55, 87, and 93 through a lead-out pipe (not shown).

Since the first to third water intake nozzles 53, 85, and 92 are provided on one side of the membrane cartridge 34 and are located at different heights, a sufficient suction pressure acts on the entire membrane cartridge 34. Consequently, it is possible to obtain treated water (permeate) using the entire filtration membrane 50 effectively.

When the difference Hd1 between the heights of the first water intake nozzle 53 and the second water intake nozzle 85 is too small, it is likely that areas where permeate can be obtained from the filtration membrane 50 by the first and second water intake nozzles 53 and 85 overlap each other and the entire filtration membrane 50 cannot be effectively used. Similarly, when the difference Hd2 between the heights of the second water intake nozzle 85 and the third water intake nozzle 92 is too small, it is likely that areas where permeate can be obtained from the filtration membrane 50 by the second and third water intake nozzles 85 and 92 overlap each other and the entire filtration membrane 50 cannot be effectively used. To cope with such a problem, the difference Hd1 between the heights of the first water intake nozzle 53 and the second water intake nozzle 85 is set to be equal to or larger than the length Lh in the sideward direction of the membrane cartridge 34 and the difference Hd2 between the heights of the second water intake nozzle 85 and the third water intake nozzle 92 is set to be equal to or larger than the length Lh in the sideward direction of the membrane cartridge 34. Consequently, it is possible to considerably reduce the overlap (interference) of the areas where the permeate can be obtained from the filtration membrane 50 by the respective water intake nozzles 53, 85, and 92 and to sufficiently draw out the ability of the membrane cartridge 34.

Since upflow 77 smoothly flows without hitting the first to third connection pipes 56, 88, and 94, the matter adhering to the membrane surface of the membrane cartridge 34 is sufficiently removed. Vibration of the connection pipes 56, 88, and 94 is reduced and it is possible to prevent a crack from occurring around the water intake nozzles 53, 85, and 92.

(2) When the membrane cartridge 34 is removed in maintenance or the like, as indicated by the virtual line of FIG. 21, the distal end of the first connection pipe 56 is removed from the first water intake nozzle 53 by using the first opened window 89 of the one side panel 39a. The distal end of the second connection pipe 88 is removed from the second water intake nozzle 85 by using the second opened window 90. The distal end of the third connection pipe 94 is removed from the third water intake nozzle 92 by using the third opened window 95.

Subsequently, as indicated by the virtual line of FIG. 21, the other side panel 39b is removed to open the other side opening 45b and remove the left or right other space maintaining member 63b from the frame body 37. Thereafter, the membrane cartridge 34 is pulled out from the inside of a casing 33 in the width direction A of the membrane cartridge 34 through the other side opening 45b and taken out to the outer side of the casing 33.

(3) When the membrane cartridge 34 is attached, as indicated by the solid line of FIG. 21, the membrane cartridge 34 is inserted from the outer side of the casing 33 in the width direction A of the membrane cartridge 34 through the other side opening 45b. Thereafter, the left or right other space maintaining member 63b is attached to the frame body 37 and the other side panel 39b is attached to the frame body 37 to close the other side opening 45b.

Thereafter, as indicated by the solid line of FIG. 21, the distal end of the first connection pipe 56 is fit in and connected to the first water intake nozzle 53 by using the first opened window 89 of the one side panel 39a. The distal end of the second connection pipe 88 is fit in and connected to the second water intake nozzle 85 by using the second opened window 90. The distal end of the third connection pipe 94 is fit in and connected to the third water intake nozzle 92 by using the third opened window 95.

In the embodiment, as shown in FIG. 20, the plurality of water intake nozzles 53, 85, and 92 are provided on one side of the membrane cartridge 34. However, the water intake nozzles 53, 85, and 92 may be provided on the opposite other side thereof. In this case, the water collecting pipes 55, 87, and 93, the connection pipes 56, 88, and 94, and the opened windows 89, 90, and 95 are also located on the opposite other side thereof. The one side panel 39a is removed and the membrane cartridge 34 is removed from and inserted into one side opening 45a.

In this embodiment, as shown in FIG. 20, the three water intake nozzles 53, 85, and 92 are provided on the side of the membrane cartridge 34. However, two or four or more water intake nozzles 53, 85, and 92 may be provided according to the size of the membrane cartridge 34. In this case, the number of each of the water collecting pipes 55, 87 and 93, the connection pipes 56, 88 and 94, and the opened windows 89, 90 and 95 only has to be caused to correspond to the number of the water intake nozzles 53, 85 and 92.

A seventh embodiment in the present invention is explained below.

Figure 22:
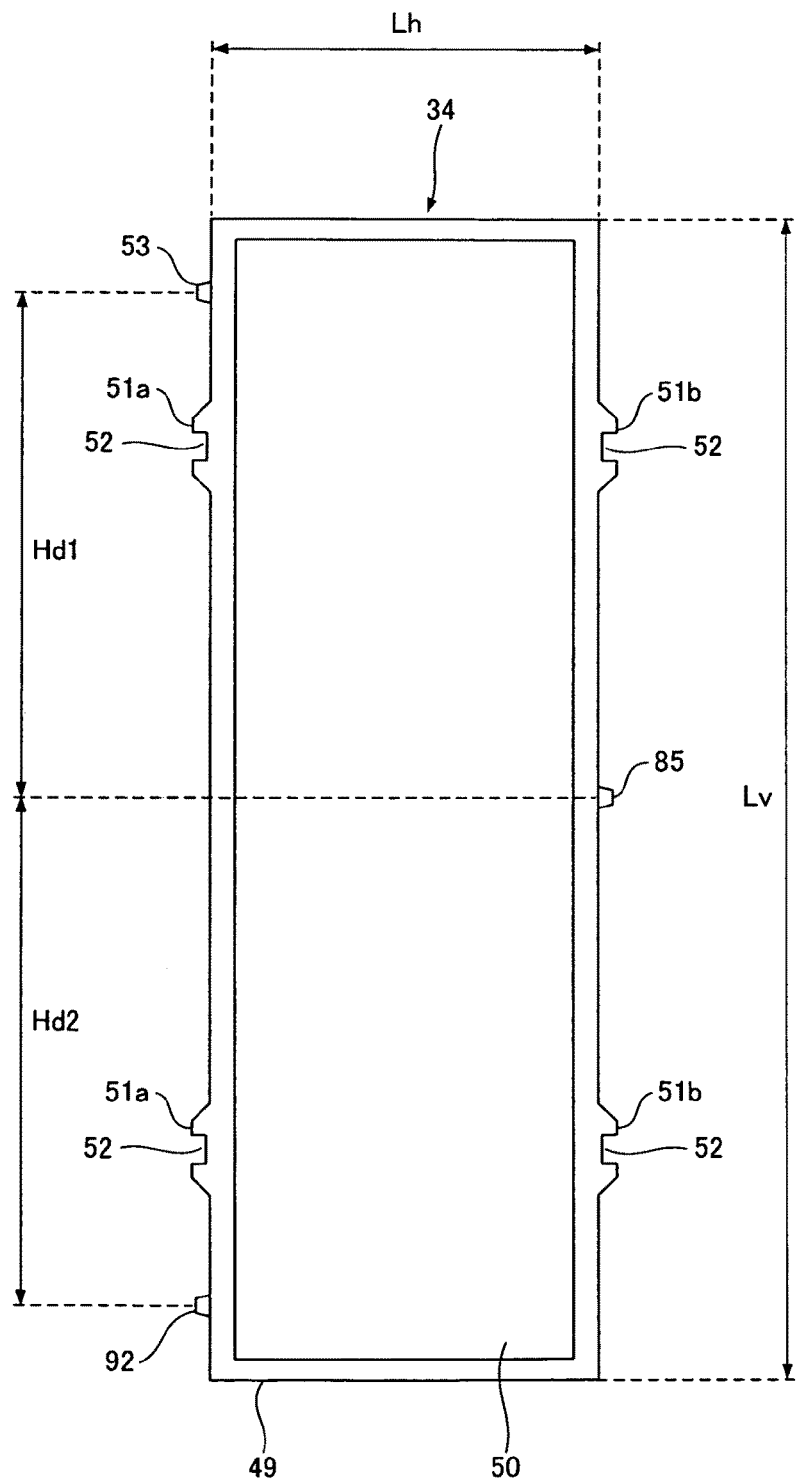
FIG. 22 is a front view of a membrane cartridge of a submerged membrane separator in a seventh embodiment of the present invention.
Figure 23:
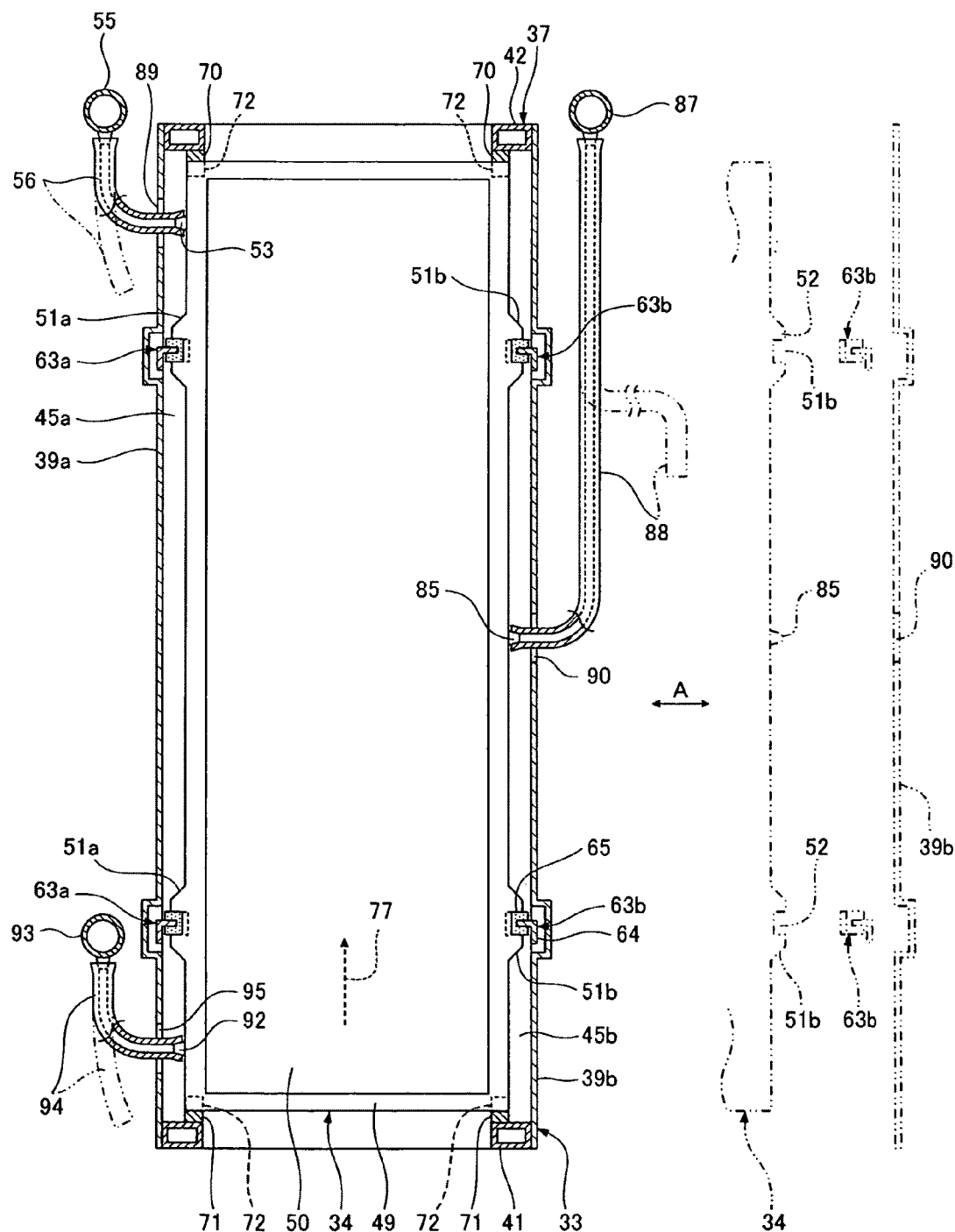
FIG. 23 is a longitudinal sectional view of the submerged membrane separator in the seventh embodiment.

As shown in FIGS. 22 and 23, first to third water intake nozzles 53, 85, and 92 are provided on sides of a filtration plate 49 of a membrane cartridge 34. Out of the first to third water intake nozzles 53, 85, and 92, the first water intake nozzle 53 is located at the upper end of one side of the membrane cartridge 34. The third water intake nozzle 92 is located at the lower end of one side of the membrane cartridge 34. The second water intake nozzle 85 is provided on the other side of the membrane cartridge 34 and is located between the upper first water intake nozzle 53 and the lower third water intake nozzle 92.

A ratio (=Lv/Lh) of a length Lv in the vertical direction (up-down direction) of the membrane cartridge 34 and a length Lh in the sideward direction (a width direction A) thereof is set to 3. A difference Hd1 between the heights of the first water intake nozzle 53 and the second water intake nozzle 85 is set to be equal to or larger than the length Lh in the sideward direction of the membrane cartridge 34 (i.e., Hd1≥Lh). A difference Hd2 between the heights of the second water intake nozzle 85 and the third water intake nozzle 92 is set to be equal to or larger than the length Lh in the sideward direction of the membrane cartridge 34 (i.e., Hd2≥Lh).

First and third water collecting pipes 55 and 93 are provided on left or right one side of a frame body 37. A second water collecting pipe 87 is provided on the left or right other side of the frame body 37. The first water collecting pipe 55 and the first water intake nozzle 53 are connected via a first connection pipe 56. The second water collecting pipe 87 and the second water intake nozzle 85 are connected via a second connection pipe 88. The third water collecting pipe 93 and the third water intake nozzle 92 are connected via a third connection pipe 94.

First and third opened windows 89 and 95 are formed in left or right one side panel 39a. A second opened window 90 is formed in the left or right other side panel 39b. Out of the first to third opened windows 89, 90, and 95, the first opened window 89 is located at the upper end of the one side panel 39a and opposed to the first water intake nozzle 53. The third opened window 95 is located at the lower end of the one side panel 39a and opposed to the third water intake nozzle 92. The second opened window 90 is located between the upper and lower ends of the other side panel 39b and opposed to the second water intake nozzle 85.

Operations in the configuration explained above are explained below.

(1) Since the first to third water intake nozzles 53, 85, and 92 are provided on the sides of the membrane cartridge 34 and located at different heights, a sufficient suction pressure acts on the entire membrane cartridge 34. Consequently, it is possible to obtain treated water (permeate) using an overall filtration membrane 50 effectively.

When the difference Hd1 between the heights of the first water intake nozzle 53 and the second water intake nozzle 85 is too small, it is likely that areas where permeate can be obtained from the filtration membrane 50 by the first and second water intake nozzles 53 and 85 overlap each other and the entire filtration membrane 50 cannot be effectively used. Similarly, when the difference Hd2 between the heights of the second water intake nozzle 85 and the third water intake nozzle 92 is too small, it is likely that areas where permeate can be obtained from the filtration membrane 50 by the second and third water intake nozzles 85 and 92 overlap each other and the entire filtration membrane 50 cannot be effectively used. To cope with such a problem, the difference Hd1 between the heights of the first water intake nozzle 53 and the second water intake nozzle 85 is set to be equal to or larger than the length Lh in the sideward direction of the membrane cartridge 34 and the difference Hd2 between the heights of the second water intake nozzle 85 and the third water intake nozzle 92 is set to be equal to or larger than the length Lh in the sideward direction thereof. Consequently, it is possible to considerably reduce the overlap (interference) of the areas where the permeate can be obtained from the filtration membrane 50 by the respective water intake nozzles 53, 85, and 92 and sufficiently draw out the ability of the membrane cartridge 34.

Since upflow 77 smoothly flows without hitting the first to third connection pipes 56, 88, and 94, the matter adhering to the membrane surface of the membrane cartridge 34 is sufficiently removed. Vibration of the connection pipes 56, 88, and 94 is reduced and it is possible to prevent a crack from occurring around the water intake nozzles 53, 85, and 92.

(2) When the membrane cartridge 34 is removed in maintenance or the like, as indicated by the virtual line of FIG. 23, the distal end of the first connection pipe 56 is removed from the first water intake nozzle 53 by using the first opened window 89 of the one side panel 39a. The distal end of the third connection pipe 94 is removed from the third water intake nozzle 92 by using the third opened window 95. The distal end of the second connection pipe 88 is removed from the second water intake nozzle 85 by using the second opened window 90 of the other side panel 39b.

Subsequently, as indicated by the virtual line of FIG. 23, the other side panel 39b is removed to open the other side opening 45b and remove the left or right other space maintaining member 63b from the frame body 37. Thereafter, the membrane cartridge 34 is pulled out from the inside of a casing 33 in the width direction A of the membrane cartridge 34 through the other side opening 45b and taken out to the outer side of the casing 33.

(3) When the membrane cartridge 34 is attached, as indicated by the solid line of FIG. 23, the membrane cartridge 34 is inserted from the outer side of the casing 33 in the width direction A of the membrane cartridge 34 through the other side opening 45b. Thereafter, the left or right other space maintaining member 63b is attached to the frame body 37 and the other side panel 39b is attached to the frame body 37 to close the other side opening 45b.

Thereafter, as indicated by the solid line of FIG. 23, the distal end of the first connection pipe 56 is fit in and connected to the first water intake nozzle 53 by using the first opened window 89 of the one side panel 39a. The distal end of the third connection pipe 94 is fit in and connected to the third water intake nozzle 92 by using the third opened window 95. The distal end of the second connection pipe 88 is fit in and connected to the second water intake nozzle 85 by using the second opened window 90 of the other side panel 39b.

In the embodiment, as shown in FIG. 22, the water intake nozzles 53 and 92 are provided on one side of the membrane cartridge 34 and the water intake nozzle 85 is provided on the other side of the membrane cartridge 34. However, the water intake nozzles 53 and 92 may be provided on the other side thereof and the water intake nozzle 85 may be provided on one side thereof. In this case, the positions of the water collecting pipes 55, 87, and 93, the connection pipes 56, 88, and 94, and the opened windows 89, 90, and 95 only have to be respectively changed to the opposite sides according to the positions of the water intake nozzles 53, 85, and 92.

One or three or more water intake nozzles 53 and 92 may be provided on one side of the membrane cartridge 34 or two or more water intake nozzles 85 may be provided on the other side of the membrane cartridge 34.

An eighth embodiment in the present invention is explained below.

Figure 24:
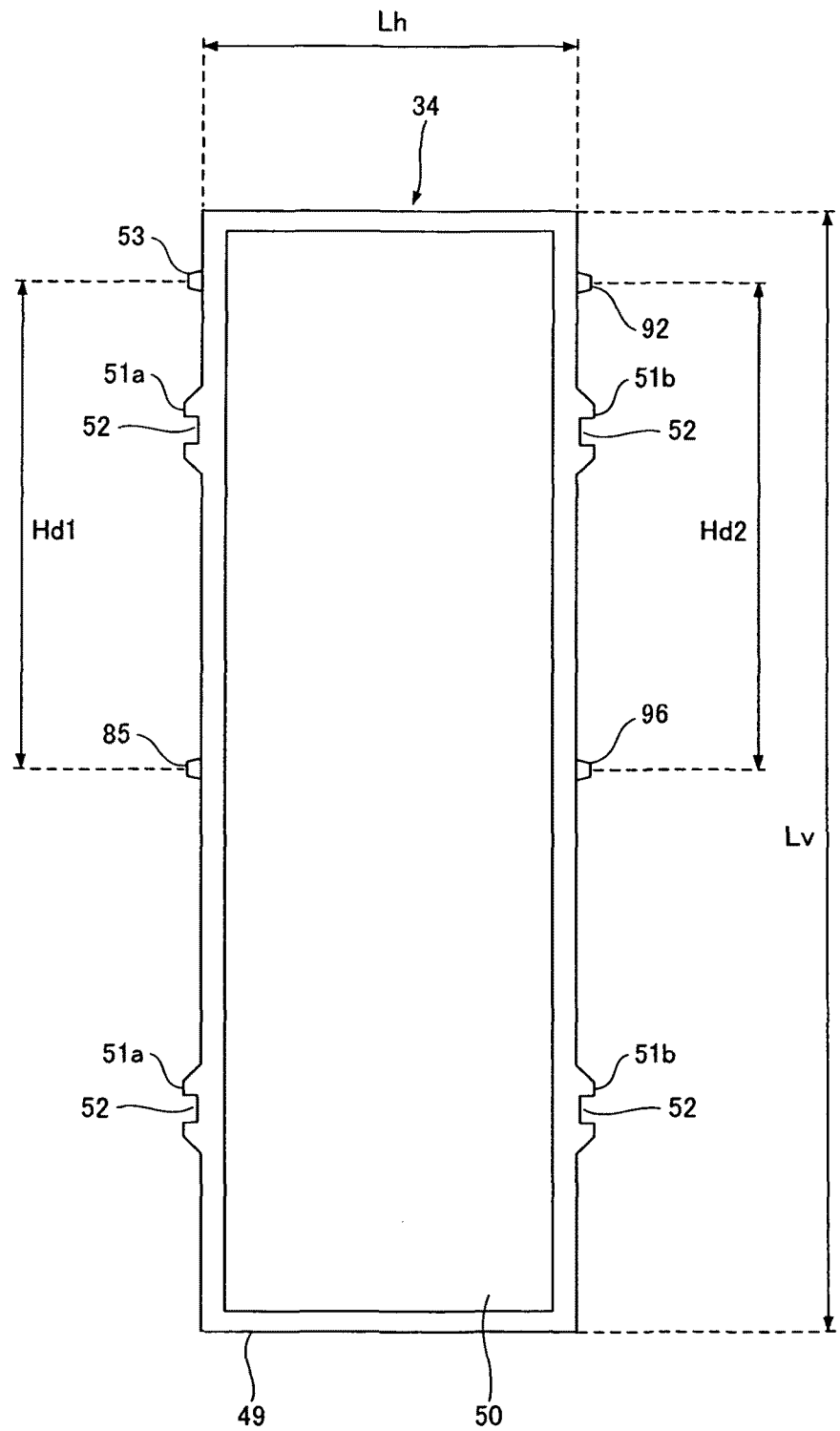
FIG. 24 is a front view of a membrane cartridge of a submerged membrane separator in an eighth embodiment of the present invention.
Figure 25:
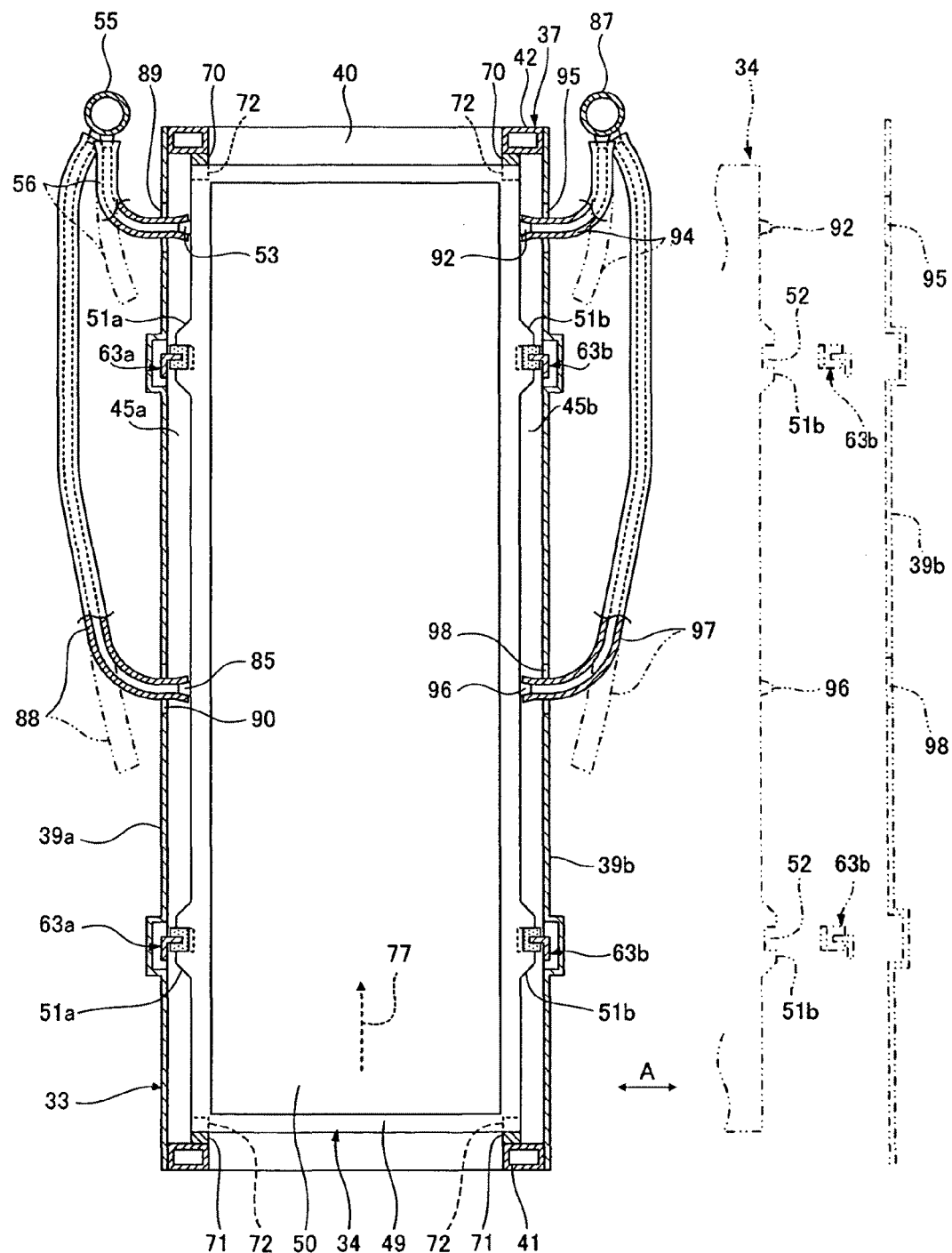
FIG. 25 is a longitudinal sectional view of the submerged membrane separator in the eighth embodiment.

As shown in FIGS. 24 and 25, first to fourth water intake nozzles 53, 85, 92, and 96 are provided on the sides of a filtration plate 49 of a membrane cartridge 34. Out of the first to fourth water intake nozzles 53, 85, 92, and 96, the first water intake nozzle 53 is located at the upper end of one side of the membrane cartridge 34. The second water intake nozzle 85 is located between the upper and lower ends of one side of the membrane cartridge 34. The third water intake nozzle 92 is located at the upper end of the other side of the membrane cartridge 34. The fourth water intake nozzle 96 is located between the upper and lower ends of the other side of the membrane cartridge 34.

The height from the lower side of the membrane cartridge 34 to the second water intake nozzle 85 is smaller than the height from the lower side of the membrane cartridge 34 to the first water intake nozzle 53. The height from the lower side of the membrane cartridge 34 to the fourth water intake nozzle 96 is smaller than the height from the lower side of the membrane cartridge 34 to the third water intake nozzle 92. The heights from the lower side of the membrane cartridge 34 to the first and third water intake nozzles 53 and 92 are the same. The heights from the lower side of the membrane cartridge 34 to the second and fourth water intake nozzles 85 and 96 are the same.

A ratio (i.e., an aspect ratio=Lv/Lh) of a length Lv in the vertical direction (up-down direction) of the membrane cartridge 34 and a length Lh in the sideward direction (a width direction A) thereof is set to 3. A difference Hd1 between the heights of the first water intake nozzle 53 and the second water intake nozzle 85 is set to be equal to or larger than the length Lh in the sideward direction of the membrane cartridge 34 (i.e., Hd1≥Lh). A difference Hd2 between the heights of the third water intake nozzle 92 and the fourth water intake nozzle 96 is set to be equal to or larger than the length Lh in the sideward direction of the membrane cartridge 34 (i.e., Hd2≥Lh).

A first water collecting pipe 55 for collecting treated water sucked from the first and second water intake nozzles 53 and 85 of the membrane cartridges 34 is provided in the front-rear direction above left or right one side of a frame body 37. A second water collecting pipe 87 for collecting treated water sucked from the third and fourth water intake nozzles 92 and 96 of the membrane cartridges 34 is provided above the left or right other side of the frame body 37.

The first water collecting pipe 55 and the first water intake nozzle 53 are connected via a first connection pipe 56. The first water collecting pipe 55 and the second water intake nozzle 85 are connected via a second connection pipe 88. The second water collecting pipe 87 and the third water intake nozzles 92 are connected via a third connection pipe 94. The second water collecting pipe 87 and the fourth water intake nozzle 96 are connected via a fourth connection pipe 97. The first to fourth connection pipes 56, 88, 94, and 97 have flexibility.

First and second opened windows 89 and 90 are formed in left or right one side panel 39a. The first opened window 89 is located at the upper end of the side panel 39a and opposed to the first water intake nozzle 53. The second opened window 90 is located between the upper and lower ends of the side panel 39a and opposed to the second water intake nozzle 85. The first connection pipe 56 is inserted through the first opened window 89 and the second connection pipe 88 is inserted through the second opened window 90.

Third and fourth opened windows 95 and 98 are formed in the left or right other side panel 39b. The third opened window 95 is located at the upper end of the side panel 39b and opposed to the third water intake nozzle 92. The fourth opened window 98 is located between the upper and lower ends of the side panel 39b and opposed to the fourth water intake nozzle 96. The third connection pipe 94 is inserted through the third opened window 95 and the fourth connection pipe 97 is inserted through the fourth opened window 98.

Operations in the configuration explained above are explained below.

(1) During a filtration operation, permeate permeating through a filtration membrane 50 and flowing into the inner side of the membrane cartridges 34 flows through a permeate channel 86 as treated water, is sucked from the first to fourth water intake nozzles 53, 85, 92, and 96, is collected in the first water collecting pipe 55 through the first and second connection pipes 56 and 88, and is collected in the second water collecting pipe 87 through the third and fourth connection pipes 94 and The first and second water intake nozzles 53 and 85 are provided on one side of the membrane cartridge 34 and located at different heights. The third and fourth water intake nozzles 92 and 96 are provided on the other side of the membrane cartridge 34 and located at different heights. Therefore, a sufficient suction pressure acts on the entire membrane cartridge 34. Consequently, it is possible to obtain treated water (permeate) using the entire filtration membrane 50 effectively.

When the difference Hd1 between the heights of the first water intake nozzle 53 and the second water intake nozzle 85 is too small, it is likely that areas where permeate can be obtained from the filtration membrane 50 by the first and second water intake nozzles 53 and 85 overlap each other and the entire filtration membrane 50 cannot be effectively used. Similarly, when the difference Hd2 between the heights of the third water intake nozzle 92 and the fourth water intake nozzle 96 is too small, it is likely that areas where permeate can be obtained from the filtration membrane 50 by the third and fourth water intake nozzles 92 and 96 overlap each other and the entire filtration membrane 50 cannot be effectively used. To cope with such a problem, the difference Hd1 between the heights of the first water intake nozzle 53 and the second water intake nozzle 85 is set to be equal to or larger than the length Lh in the sideward direction of the membrane cartridge 34 and the difference Hd2 between the heights of the third water intake nozzle 92 and the fourth intake nozzle 96 is set to be equal to or larger than the length Lh in the sideward direction of the membrane cartridge 34. Consequently, it is possible to considerably reduce the overlap (interference) of the areas where the permeate can be obtained from the filtration membrane 50 by the respective water intake nozzles 53, 85, 92, and 96 and to sufficiently draw out the ability of the membrane cartridge 34.

Since upflow 77 smoothly flows without hitting the first to fourth connection pipes 56, 88, 94, and 97, the matter adhering to the membrane surface of the membrane cartridge 34 is sufficiently removed. Vibration of the connection pipes 56, 88, 94, and 97 is reduced and it is possible to prevent a crack from occurring around the water intake nozzles 53, 85, 92, and 96.

The first and second connection pipes 56 and 88 are connected to the common first water collecting pipe 55 and the third and fourth connection pipes 94 and 97 are connected to the common second water collecting pipe 87. Therefore, it is possible to reduce the number of the water collecting pipes 55 and 87 with respect to the number of the water intake nozzles 53, 85, 92, and 96.

(2) When the membrane cartridge 34 is removed in maintenance or the like, as indicated by the virtual line of FIG. 25, the distal end of the first connection pipe 56 is removed from the first water intake nozzle 53 by using the first opened window 89 of the one side panel 39a. The distal end of the second connection pipe 88 is removed from the second water intake nozzle 85 by using the second opened window 90. The distal end of the third connection pipe 94 is removed from the third water intake nozzle 92 by using the third opened window 95 of the other side panel 39b. The distal end of the fourth connection pipe 97 is removed from the fourth water intake nozzle 96 by using the fourth opened window 98.

Subsequently, as indicated by the virtual line of FIG. 25, the other side panel 39b is removed to open the other side opening 45b and remove the left or right other space maintaining member 63b from the frame body 37. Thereafter, the membrane cartridge 34 is pulled out from the inside of a casing 33 in the width direction A of the membrane cartridge 34 through the other side opening 45b and taken out to the outer side of the casing 33.

(3) When the membrane cartridge 34 is attached, as indicated by the solid line of FIG. 25, the membrane cartridge 34 is inserted from the outer side of the casing 33 in the width direction A of the membrane cartridge 34 through the other side opening 45b. Thereafter, the left or right other space maintaining member 63b is attached to the frame body 37 and the other side panel 39b is attached to the frame body 37 to close the other side opening 45b.

Thereafter, as indicated by the solid line of FIG. 25, the distal end of the first connection pipe 56 is fit in and connected to the first water intake nozzle 53 by using the first opened window 89. The distal end of the second connection pipe 88 is fit in and connected to the second water intake nozzle 85 by using the second opened window 90. The distal end of the third connection pipe 94 is fit in and connected to the third water intake nozzle 92 by using the third opened window 95. The distal end of the fourth connection pipe 97 is fit in and connected to the fourth water intake nozzle 96 by using the fourth opened window 98.

In the embodiment, as shown in FIG. 24, the two water intake nozzles 53 and 85 are provided on one side of the membrane cartridge 34. However, one or three or more water intake nozzles 53 and 85 may be provided. The two water intake nozzles 92 and 96 are provided on the other side of the membrane cartridge 34. However, one or three or more water intake nozzles 92 and 96 may be provided. In this case, the numbers and positions of the connection pipes 56, 88, 94, and 97 and the opened windows 89, 90, 95, and 98 only have to be changed according to the number and positions of the water intake nozzles 53, 85, 92, and 96.

In the fourth to eighth embodiments, the opened windows 89 and 90 are formed in the one side panel 39a. However, instead of forming the opened windows 89 and 90, it is also possible to divide the one side panel 39a into a plurality of upper and lower panel pieces, form spaces between these panel pieces, and attach the distal ends of the connection pipes to and detach the distal ends of the connection pipes from the water intake nozzles using the spaces. Similarly, the opened windows 95 and 98 are formed in the other side panel 39b. However, instead of forming the opened windows 95 and 98, it is also possible to divide the other side panel 39b into a plurality of upper and lower panel pieces, form spaces between these panel pieces, and attach the distal ends of the connection pipes to and detach the distal ends of the connection pipes from the water intake nozzles using the spaces.

Figure 26:
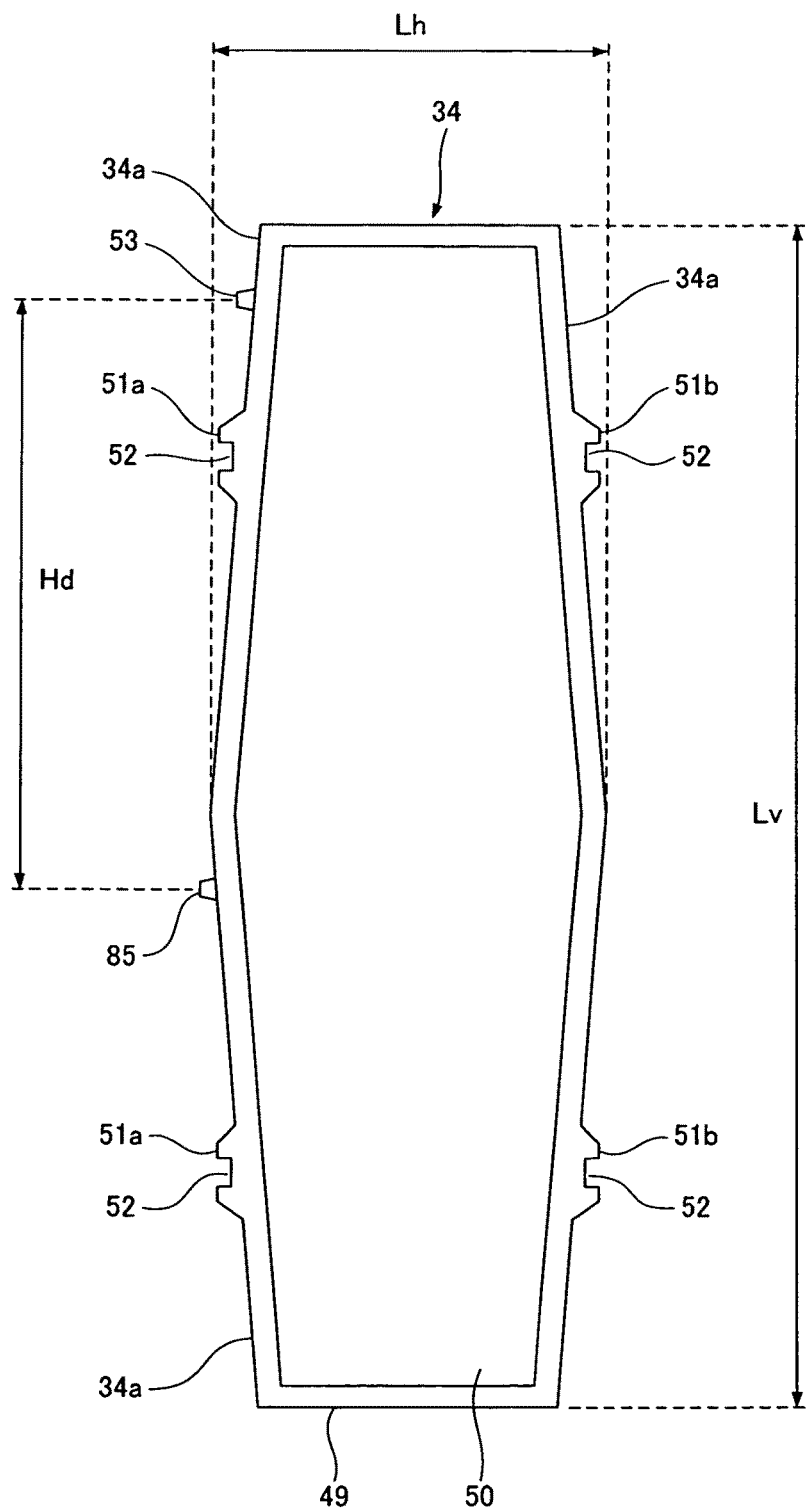
FIG. 26 is a front view of a membrane cartridge of a submerged membrane separator in a ninth embodiment of the present invention.
Figure 27:
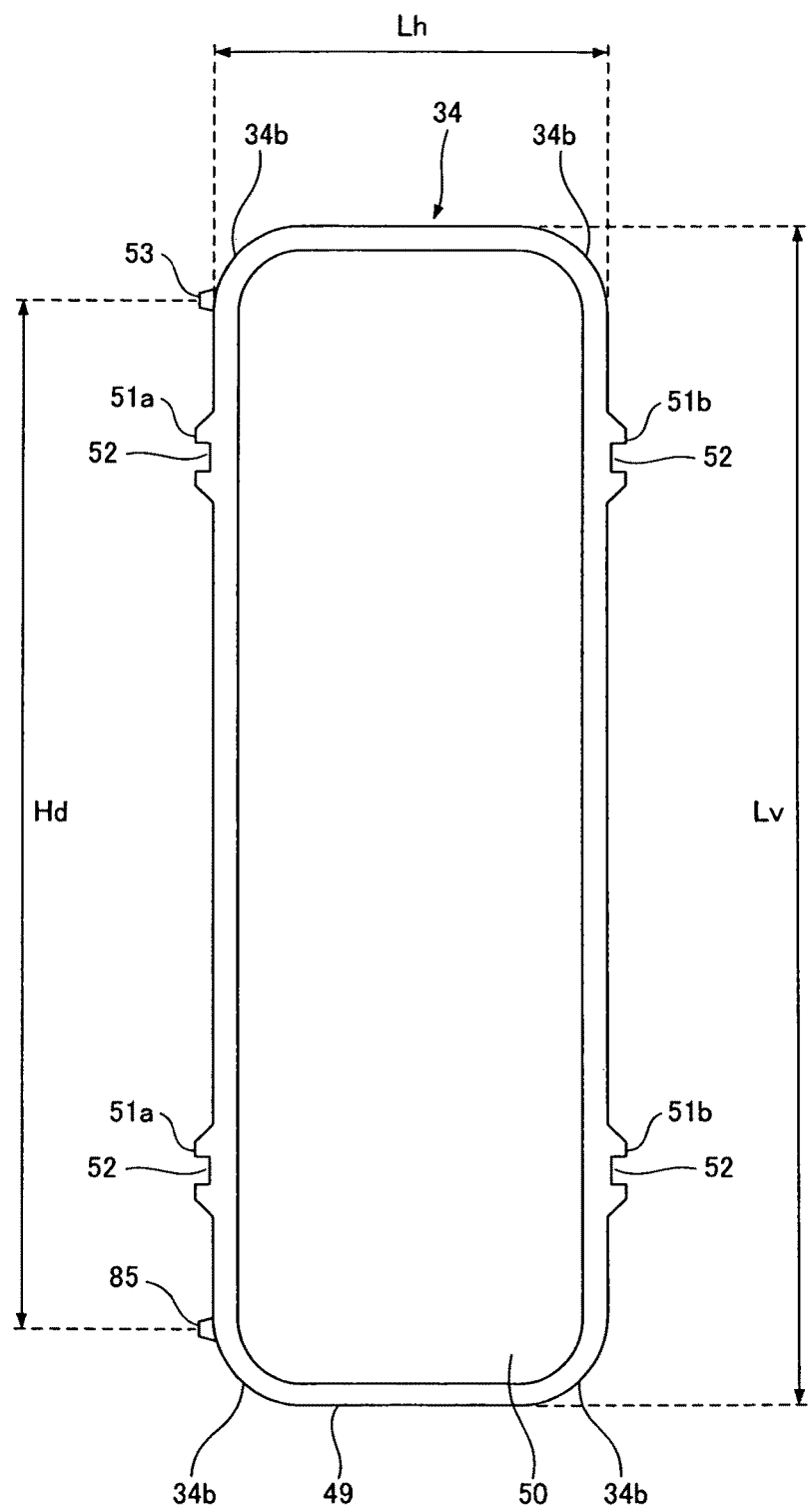
FIG. 27 is a front view of a membrane cartridge of a submerged membrane separator in a tenth embodiment of the present invention.
Figure 28:
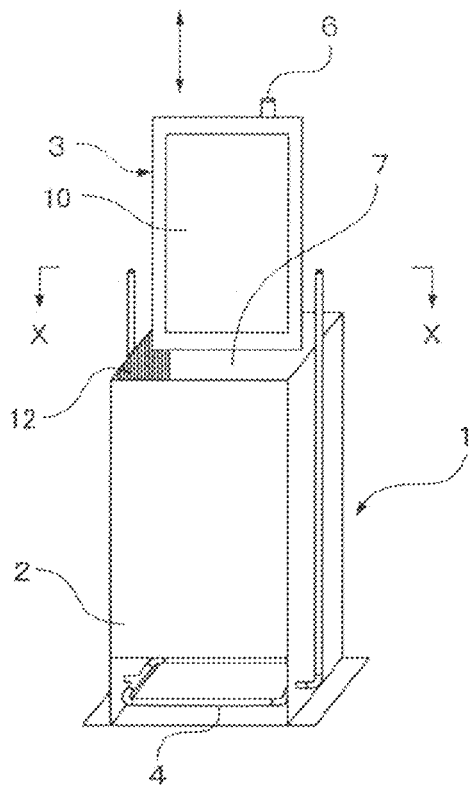
FIG. 28 is a perspective view of a submerged membrane separator in the prior art.
Figure 29:
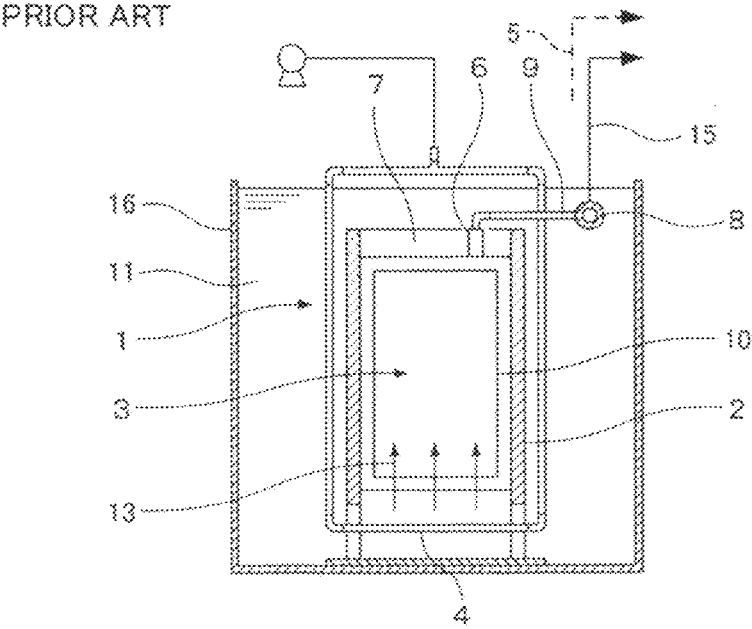
FIG. 29 is a schematic longitudinal sectional view showing the configuration of the submerged membrane separator in the prior art.

In the embodiments, the membrane cartridge 34 is formed in an elongated rectangle. However, the membrane cartridge 34 is not limited to the rectangle. The membrane cartridge 34 may be formed in a shape with a side 34a inclining with respect to the vertical direction, for example, as shown in FIG. 26 as a ninth embodiment, as long as the shape is an elongated shape. The membrane cartridge 34 may be formed in a shape with four corners 34b formed in a circular shape as shown in FIG. 27 as a tenth embodiment.

In the fourth to tenth embodiments, the ratio (aspect ratio=Lv/Lh) of the length Lv in the vertical direction of the membrane cartridge 34 and the length Lh in the sideward direction thereof is set to 3. When the water intake nozzle 53 is provided in only one position at the upper end of the membrane cartridge 34, if the aspect ratio (=Lv/Lh) exceeds 2.5, the rate of increase of flux of permeate with respect to an increase in an area of the filtration membrane 50 suddenly decreases. Therefore, when the aspect ratio (=Lv/Lh) is equal to or larger than a lower limit of 2.5, the configuration having a plurality of water intake nozzles is effective. In terms of the handleability of the membrane cartridge 34, the upper limit of the aspect ratio is desirably equal to or smaller than 4.

The invention claimed is:

1. A submerged membrane separator, comprising:
a casing having an inside defined by a frame body, the frame body comprising an upper frame and a bottom frame;
a filtration membrane arranged on a surface of a flat membrane cartridge;
a plurality of the membrane cartridges removably arranged in the casing at predetermined intervals between the filtration membranes of the membrane cartridges opposed to each other, each of the membrane cartridges being inserted into and removed from the casing from a sideward direction orthogonal to a flow in one direction along a membrane surface of the membrane cartridge;
first and second upper guiding members fixed to the inside of the casing at the upper frame of the frame body, the first and second upper guiding members having a comb-tooth shape, the first and second upper guiding members being spaced apart from each other at an interval in a width direction of the membrane cartridge, the first upper guiding member being dimensioned to engage a portion of an upper edge of the membrane cartridge that is disposed near an end of the membrane cartridge, the second upper guiding member being dimensioned to engage another portion of the upper edge of the membrane cartridge that is disposed near an opposite end of the membrane cartridge;
first and second lower guiding members fixed to the inside of the casing at the bottom frame of the frame body, the first and second lower guiding members having a comb-tooth shape, the first and second lower guiding members being spaced apart from each other at an interval in the width direction of the membrane cartridge, the first lower guiding member being dimensioned to engage a portion of a lower edge of the membrane cartridge that is disposed near the end of the membrane cartridge, the second lower guiding member being dimensioned to engage another portion of the lower edge of the membrane cartridge that is disposed near the opposite end of the membrane cartridge; and
a flow generating device configured to generate the flow in one direction along the membrane surface of the membrane cartridge,
wherein the first and second upper guiding members do not engage a middle portion of the upper edge of the membrane cartridge,
wherein the first and second lower guiding members do not engage a middle portion of the lower edge of the membrane cartridge,
wherein each of the upper and lower guiding members has a plurality of guiding grooves configured to guide the membrane cartridges one by one to a pulling and inserting direction, the membrane cartridges being configured to move in the pulling and inserting direction in a state that the upper guiding members and the lower guiding members are attached and fixed to the inside of the casing, and
wherein the pulling and inserting direction of the membrane cartridges is a direction substantially orthogonal to the flow in the one direction and substantially orthogonal to an arrangement direction of the membrane cartridges.

2. The submerged membrane separator according to claim 1, wherein an upper part of the casing is opened,
wherein an air diffuser for generating upflow along the membrane surface of the membrane cartridge is provided below the membrane cartridge, and
wherein the membrane cartridge is removed from and inserted into the casing from a sideward direction orthogonal to the upflow.

3. The submerged membrane separator according to claim 1 or 2, wherein a side opening is provided on a side of the casing and covered by an openable and closable or detachable side panel, the membrane cartridge being removed from and inserted into said casing through said side opening on said side of said casing.

4. The submerged membrane separator according to claim 1 or 2, wherein a space maintaining member for maintaining a space between the membrane cartridges is disposed on a side of the membrane cartridge.

5. The submerged membrane separator according to claim 1 or 2, wherein a water intake portion for sucking treated water obtained by membrane filtration is provided on the side of the membrane cartridge substantially orthogonal to said pulling and inserting direction.

6. The submerged membrane separator according to claim 5, wherein a plurality of water intake nozzles is provided and heights from a lower side of the membrane cartridge to the water intake nozzles are different from one another.

7. The submerged membrane separator according to claim 6, wherein the plurality of water intake nozzles is provided on one side of the membrane cartridge.

8. The submerged membrane separator according to claim 7, wherein a difference in height between the water intake nozzles is equal to or larger than a length in the sideward direction of the membrane cartridge.

9. The submerged membrane separator according to claim 1 or 2, wherein the upper edges of the membrane cartridge are inserted into the guiding grooves of the first and second upper guiding members, the lower edges of the membrane cartridge are inserted into the guiding grooves of the first and second lower guiding members, and a height between upper inner surfaces of the guiding grooves of the first and second upper guiding member and lower inner surfaces of the guiding grooves of the first and second lower guiding member is higher than a height of the membrane cartridge.

* * * * *